United States Patent
Dodin

(10) Patent No.: US 8,662,384 B2
(45) Date of Patent: Mar. 4, 2014

(54) TEXT MESSAGE PAYMENT

(75) Inventor: Ramy Dodin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1713 days.

(21) Appl. No.: 11/364,571

(22) Filed: Feb. 28, 2006

(65) Prior Publication Data

US 2007/0203836 A1 Aug. 30, 2007

(51) Int. Cl.
*G06Q 40/00* (2012.01)
*G07D 11/00* (2006.01)
*G06K 5/00* (2006.01)
*G06F 7/08* (2006.01)
*G06K 15/00* (2006.01)
*G06K 19/00* (2006.01)
*G06Q 30/00* (2012.01)
*G06Q 50/00* (2012.01)
*G06Q 20/00* (2012.01)

(52) U.S. Cl.
USPC .......... 235/379; 235/380; 235/381; 235/378; 235/487; 705/64; 705/78; 705/26.9; 705/16; 705/15

(58) Field of Classification Search
USPC ......... 705/64–79, 26.9, 16, 15; 235/375, 378, 235/379, 380, 381, 449, 451, 487, 492, 493
See application file for complete search history.

(56) References Cited

U.S. PATENT DOCUMENTS

| | | | | |
|---|---|---|---|---|
| 5,708,422 A * | 1/1998 | Blonder et al. | ............... | 340/5.41 |
| 5,914,472 A * | 6/1999 | Foladare et al. | ............... | 235/380 |
| 6,317,718 B1 * | 11/2001 | Fano | ........................... | 705/14.39 |
| 7,031,733 B2 | 4/2006 | Alminana et al. | | |
| 7,076,329 B1 | 7/2006 | Kolls | | |
| 7,127,264 B2 | 10/2006 | Hronek et al. | | |
| 7,245,902 B2 | 7/2007 | Hawkes | | |
| 7,251,495 B2 | 7/2007 | Keyani et al. | | |
| 7,331,518 B2 * | 2/2008 | Rable | ............................ | 235/380 |
| 7,370,012 B2 * | 5/2008 | Karns et al. | ..................... | 705/39 |
| 7,379,920 B2 * | 5/2008 | Leung et al. | ..................... | 705/67 |
| 7,533,058 B2 * | 5/2009 | Kulakowski | ..................... | 705/40 |
| 7,873,572 B2 * | 1/2011 | Reardon | ........................ | 705/39 |
| 8,332,314 B2 * | 12/2012 | Griffin | ............................ | 705/39 |
| 8,412,626 B2 * | 4/2013 | Hirson et al. | ................... | 705/39 |
| 2001/0037254 A1 * | 11/2001 | Glikman | ........................ | 705/26 |
| 2001/0037264 A1 * | 11/2001 | Husemann et al. | ............ | 705/26 |
| 2002/0061094 A1 * | 5/2002 | Walker et al. | .............. | 379/93.12 |
| 2002/0147658 A1 * | 10/2002 | Kwan | ............................ | 705/26 |
| 2003/0061111 A1 * | 3/2003 | Dutta et al. | .................... | 705/26 |
| 2003/0065615 A1 * | 4/2003 | Aschir | ........................... | 705/39 |

(Continued)

OTHER PUBLICATIONS

*Mobile Payment—Product and Service Description*, downloaded from http://www.mobileweb.be/en/sms-payment.asp on Oct. 24, 1007, 3 pages.

(Continued)

*Primary Examiner* — Daniel Walsh
(74) *Attorney, Agent, or Firm* — Johnson, Marcou & Isaacs, LLC

(57) ABSTRACT

A computer-implemented method of effectuating an electronic on-line payment includes receiving at a computer server system a text message from a payor containing a payment request representing a payment amount sent by a payor device operating independently of the computer server system, determining a payment amount associated with the text message and debiting a payor account for an amount corresponding to the amount of the payment request, and crediting an account of a payee that is independent of the computer server system.

19 Claims, 10 Drawing Sheets

(56) References Cited

U.S. PATENT DOCUMENTS

| | | | |
|---|---|---|---|
| 2003/0110114 A1 | 6/2003 | Dmochowski | |
| 2003/0139174 A1* | 7/2003 | Rao | 455/418 |
| 2003/0171993 A1* | 9/2003 | Chappuis | 705/16 |
| 2003/0172040 A1* | 9/2003 | Kemper et al. | 705/75 |
| 2003/0212601 A1* | 11/2003 | Silva et al. | 705/17 |
| 2004/0019564 A1* | 1/2004 | Goldthwaite et al. | 705/44 |
| 2004/0030654 A1* | 2/2004 | Walker et al. | 705/53 |
| 2004/0078340 A1 | 4/2004 | Evans | |
| 2004/0143545 A1* | 7/2004 | Kulakowski | 705/39 |
| 2004/0199470 A1* | 10/2004 | Ferry et al. | 705/44 |
| 2004/0214597 A1 | 10/2004 | Suryanarayana et al. | |
| 2005/0144020 A1 | 6/2005 | Muzaffar et al. | |
| 2005/0220134 A1 | 10/2005 | Lin | |
| 2005/0238149 A1 | 10/2005 | De Leon | |
| 2006/0080232 A1* | 4/2006 | Epps | 705/39 |
| 2006/0149644 A1* | 7/2006 | Sulmar et al. | 705/34 |
| 2006/0253339 A1* | 11/2006 | Singh et al. | 705/26 |
| 2007/0054678 A1 | 3/2007 | Doulton | |
| 2007/0094135 A1* | 4/2007 | Moore et al. | 705/40 |
| 2007/0100651 A1* | 5/2007 | Ramer et al. | 705/1 |
| 2007/0106564 A1* | 5/2007 | Matotek et al. | 705/26 |
| 2007/0203836 A1* | 8/2007 | Dodin | 705/44 |
| 2007/0205270 A1* | 9/2007 | Kemper et al. | 235/380 |
| 2007/0213991 A1* | 9/2007 | Bramante | 705/1 |
| 2007/0228148 A1* | 10/2007 | Rable | 235/379 |
| 2007/0233615 A1* | 10/2007 | Tumminaro | 705/75 |
| 2007/0255620 A1* | 11/2007 | Tumminaro et al. | 705/14 |
| 2007/0255652 A1* | 11/2007 | Tumminaro et al. | 705/39 |
| 2007/0255653 A1* | 11/2007 | Tumminaro et al. | 705/39 |
| 2007/0255662 A1* | 11/2007 | Tumminaro | 705/79 |
| 2008/0003477 A1* | 1/2008 | Chakiris et al. | 455/407 |
| 2008/0006685 A1* | 1/2008 | Rackley, III et al. | 235/379 |
| 2008/0010190 A1* | 1/2008 | Rackley, III et al. | 705/39 |
| 2008/0010191 A1* | 1/2008 | Rackley, III et al. | 705/39 |
| 2008/0010192 A1* | 1/2008 | Rackley, III et al. | 705/39 |
| 2008/0010193 A1* | 1/2008 | Rackley, III et al. | 705/39 |
| 2008/0010196 A1* | 1/2008 | Rackley, III et al. | 705/40 |
| 2008/0010204 A1* | 1/2008 | Rackley, III et al. | 705/45 |
| 2008/0010215 A1* | 1/2008 | Rackley, III et al. | 705/70 |
| 2008/0021761 A1* | 1/2008 | Rable | 705/10 |
| 2008/0027844 A1* | 1/2008 | Little et al. | 705/35 |
| 2008/0040265 A1* | 2/2008 | Rackley, III et al. | 705/40 |
| 2008/0059375 A1* | 3/2008 | Abifaker | 705/44 |
| 2008/0065531 A1* | 3/2008 | Smith et al. | 705/39 |
| 2008/0133403 A1* | 6/2008 | Hamzeh | 705/39 |
| 2008/0162348 A1* | 7/2008 | Lee et al. | 705/44 |
| 2008/0182551 A1* | 7/2008 | Lovell | 455/407 |
| 2008/0243650 A1* | 10/2008 | Yoon | 705/30 |
| 2008/0255991 A1* | 10/2008 | Wang | 705/42 |
| 2009/0070257 A1* | 3/2009 | Csoka | 705/39 |
| 2009/0150248 A1* | 6/2009 | Ling et al. | 705/17 |
| 2010/0114775 A1* | 5/2010 | Griffin | 705/44 |
| 2010/0185544 A1* | 7/2010 | Adiseshann | 705/44 |
| 2011/0022515 A1* | 1/2011 | Tallitsch et al. | 705/40 |
| 2012/0209768 A1* | 8/2012 | Nuzzi | 705/44 |
| 2012/0209772 A1* | 8/2012 | Nuzzi et al. | 705/44 |
| 2012/0209773 A1* | 8/2012 | Ranganathan | 705/44 |
| 2013/0030964 A1* | 1/2013 | Nuzzi et al. | 705/30 |
| 2013/0124405 A1* | 5/2013 | Hamzeh | 705/39 |
| 2013/0173404 A1* | 7/2013 | Scipioni | 705/16 |

OTHER PUBLICATIONS

*Anam introduces SMS payments*, downloaded from http://www.theregister.co.uk/2007/06/18/hash_cash_sms_payments/print.html on Oct. 24, 2007, 2 pages.

*Welcome to Sepomo Micropayments*, downloaded from http://www.sepomo.com/en/welcom.php on Oct. 24, 2007, 4 pages.

*Make mobile content delivery and billing cost effective, simple and fast with mSERV!*, downloaded from http://mbill.biz/solutions/mserv/?gclid—CMHBhMasq18DFRUHWAod62K8Sg on Oct. 24, 2007, 2 pages.

*All about texting, SMS and MMS*, downloaded from http://www.textually.org/textually/archives/cat_sms_and_micro_payments.htm on Oct. 24, 2007, 10 pages.

*PayPal to rival TextPayMe for SMS payments?*, downloaded from http://www.engadget.com/2006/02/03/paypal-to-rival-textpayme-for-sms-payments on Oct. 24, 2007 11 pages.

*PayPal to launch SMS payments service*, downloaded from http://www.finextra.com/fullstory.asp?id=15091 on Oct. 24, 2007, 2 pages.

*US Catches on with SMS Payments*, downloaded from http://yugatech.com/blog/the-internet/us-catches-on-with-sms-payments on Dec. 24, 2007, 8 pages.

*SMS Payment*, downloaded from http://www.moldcell.md/eng.Services/Payments./SMSpayment on Oct. 24, 2007, 2 pages.

*Secure SMS Payment Solutions*, downloaded from http://www.eko.com.au/?Solutions/Payment on Oct. 24, 2007, 2 pages.

*Why is SMS Marketing more effective than traditional methods?*, downloaded from http://www.market-to-cell.com/?ppc_id=105432 &type—GoogleAdwordsSearch&ppc_kw . . . on Oct. 24, 2007, 4 pages.

*SMS/mobile micro payments—how to?*, downloaded from http://quomon.com/question_SMS_mobile_micro_payments_to_193.aspx on Oct. 24, 2007, 3 pages.

Mobile Payment: A Journey Through Existing Procedures and Standardization Initiatives, by Karnouskos et al., for *IEEE Communications Surveys, The Electronic magazine of Original Peer-Reviewed Survey Articles*, Fourth Quarter 2004, vol. 6, No. 4, pp. 44-66.

'You've Got Money: Paying via Text Message', [online]. *The Wall Street Journal Online*, Apr. 26, 2006, retrieved from the Internet: /URL's: http://online.wsj.com/article_print/SB114600991211335921.html [retrieved on Feb. 8, 2007].

'Atlas Telecom Mobile launches an international text message based payment solution for Internet content' [online]. SMS Kambi, 2003, [retrieved on Nov. 6, 2006]. Retrieved from the Internet: <URL:www.smskambi.com/en/press/2003-03-13.jsp>, 1 page.

'Atlas Telecom Mobile will offer its payment solution via mobile phone to Tadaa Wireless WiFi clientele' [online]. SMS Kambi, 2003, [retrieved on Nov. 6, 2006]. Retrieved from the Internet: <URL:www.smskambi.com/en/press/2003-07-17.jsp>, 1 page.

'Frequently Asked Questions: Answers to all your questions about SMS Kambi' [online]. SMS Kambi, 2003, [retrieved on Jun. 11, 2006]. Retrieved from the Internet: <URL: www.smskambi.com/en/faq.jsp>, 5 pages.

'What is TextPayMe?' [online]. TextPayMe, 2005-2006, [retrieved on Nov. 6, 2006]. Retrieved from the Internet: <URL:www.textpayme.com/us/secure/index.tpm>, 1 page.

'TextPayMe Tour' [online]. TextPayMe, 2005-2006, [retrieved on Nov. 6, 2006]. Retrieved from the Internet: <URL's: www.textpayme.com/us/tour/tour1.tpm; www.textpayme.com/us/tour/tour2.tpm; www.textpayme.com/us/tour/tour3.tpm; www.textpayme.com/us/tour/tour4.tpm; www.textpayme.com/us/secure/register.tpm>, 6 pages.

'PayPal Goes Mobile' [online]. PayPal, 1999-2006, [retrieved on Nov. 6, 2006]. Retrieved from the Internet: <URL's:www.paypal.com/cgi-bin/webscr?cmd=xpt/cps/mobile/MobileOverview-outside; www.paypal.com/cgi-bin/webscr?cmd=xpt/mobile/MobileSend-outside; www.paypal.com/cgi-bin/webscr?cmd=xpt/cps/mobile/MobileT2B-outside; www.paypal.com/cgi-bin/webscr?cmd=xpt/cps/mobile/Text2Give-outside; www.paypal.com/cgi-bin/webscr?cmd=xpt/cps/ mobile/MobileFAQ-outside; www.shareholder.com/paypal/releaseDetail.cfm?ReleaseID=192226 &Category=US>, 14 pages.

'SMS Payment' [online]. Moldcell, 2006, [retrieved on Nov. 6, 2006]. Retrieved from the Internet: <URL:www.moldcell.md/eng/Services/Payments/SMSpayment>, 2 pages.

'Paypal to offer SMS payment' [online]. Iol, 2006, [retrieved on Nov. 6, 2006]. Retrieved from the Internet: <URL: www.iol.co.za/index.php?set_id=1&click_id=115&art_id=iol1143117211111P140>, 2 pages.

'MobileLime makes shopping more rewarding' [online]. MobileLine, 2006, [retrieved on Nov. 6, 2006]. Retrieved from the Internet: <URL: www.mobilelime.com/mobilelime/home.do?action=index; www.mobilelime.com/mobilelime/home.do?action=consumers; www.mobilelime.com/mobilelime/home.do?action=earnrewards;www.mobilelime.com/mobilelime/home.do?action=makepurchases; www.mobilelime.com/mobilelime/home.do?action=doitall; www.mobilelime.com/mobilelime/home.

(56) References Cited

OTHER PUBLICATIONS do?action=whouses; www.mobilelime.com/mobilelime/home.do?action=pressreleasedetails&contentid=209>, 10 pages.
obopay' [online]. Obopay, 2006, [retrieved on Nov. 6, 2006]. Retrieved from the Internet: <URL: https://www.obopay.com/consumer/; www.obopay.eom/consumer/GetHelp.do;jsessionid=Flndf7KYsThCHJ2HZ2Hz1Ck472YlcL6mXbzGyZFyGJvLt2RDjbLz!-468797365?target=LearnMorePage; www.obopay.com/consumer/GetHelp.do?target=HelpTextMessagingPage; www.obopay.com/consumer/GetHelp.do?target=HelpHowWorks>, 8 pages.
'BillMonk,' [online]. BillMonk, 2006, [retrieved on Nov. 6, 2006]. Retrieved from the Internet: <URL: www.billmonk.com/; www.billmonk.com/about/faq; www.billmonk.com/about/sms; https://www.billmonk.com/images/screenshot_sms_shared_flow.png>, 15 pages.

* cited by examiner

Gpay

Range Dec ▶ 1 ▶ 2005 ▶     Account of : Joe Lowens
        Dec ▶ 31 ▶ 2005 ▶     Account ID : J Lo    [XML]

Receipts

| Party | Date / Time | Status | Amount |
|---|---|---|---|
| ⊞ ☐ Billyjean (6) | December 12, 2005 1:26 pm | Closed | 3.00 |
| ⊟ ☐ Corduroy (2) | December 23, 2005 2:00 pm | Closed | 3.50 |
| | | | 0.40 |
| Total | | | 6.90 |

Payments

| Party | Date / Time | Status | Amount |
|---|---|---|---|
| ⊞ ☐ Starbucks (32) | December 1, 2005 3:00 pm | Closed | 123.20 |
| ⊟ ☐ Target.com (2) | December 24, 2005 4:22 pm | Closed | 3.75 |
| | | | 287.50 |
| ⊞ ☐ UStamps (9) | December 12, 2005 12:00 pm | Open | 5.00 |
| ⊟ ☐ VeggieGirl (1) | | | |
| Total | | | 419.45 |

FIG. 7A

TEXT MESSAGE PAYMENT

TECHNICAL FIELD

This invention relates to computer-enabled payment systems and methods, and more particularly to payment systems that make use of text messaging.

BACKGROUND

Payment systems have evolved significantly over the years. Initially, simple barter was the main mode of commerce, with a farmer trading food in exchange for tools from a blacksmith. Cultures eventually learned the benefits of genericizing trade, by forming units of money that could be traded freely for all types of goods and service. Money allowed for a "disconnect" between the needs of the vendor and the needs of the vendee, in that the vendee (now a payor) could obtain tools or other goods even if the vendee did not have any products or services that the vendor (now the payee) wanted. The development of money thus removed substantial friction from commerce, and permitted more immediate, flexible, and inexpensive trade between people.

Later, various complex trading systems developed. For example, paper checks have been commonly used as a mode of payment. While checks provide security for the buyer (i.e., they are harder for thieves to use than is cash), they are also less flexible in many ways. For example, the user must carry the checks with him or her. Also, the checks themselves are not guaranteed, so a vendor must trust that the check can ultimately be turned into something of value, like cash or a transfer of funds into the vendor's account. As a result, vendors may use manual (e.g., checking ID) or electronic means to verify the legitimacy of a check, or may institute severe penalties for "bounced" checks so as to discourage illicit use of checks and/or recoup costs incurred from bad checks. Because of these well-known limits, many vendors do not take checks. Also, checks cost money to process and time to fill out (while other people waiting in line behind the check writer fidget angrily), so they are not particularly suited for small-value transactions.

Credit and debit cards are other popular and well-known payment systems. However, they typically require the purchase by a vendor of specialized equipment, and the provision of a communication channel to the card issuer. In addition, credit and debit card companies often charge relatively large transaction fees. As a result, the use of credit or debit cards for low-value transactions, for small vendors, or in locations where access to card-processing technology is unavailable, is not wholly satisfactory.

Other electronic payment systems permit simplified payment to a single vendor. For example, certain organizations permit their customers to register with a bill-paying system. Some of these systems, like common toll road systems, may initially receive payment information, such as a credit card number, from a user, and then may allow the user to dial in or otherwise communicate with the system to pay their bills or put money into their account.

SUMMARY

This document generally describes systems and methods that may permit a payor to make payments to various payees. The payment process may occur through the simple composition by the payor of a text message that includes identifying information for the payee and an amount of the payment. The message may then be sent to a payment processing system, which may debit an account of the payor (i.e., reduce it in value), credit an account of the payee (i.e., increase it in value, such as monetary value), and notify either or both of the payor or the payee that the money has been transferred.

In one aspect, a computer-implemented method of effectuating an electronic on-line payment is discussed. The method comprises receiving at a computer server system a text message from a payor containing a payment request representing a payment amount sent by a payor device operating independently of the computer server system, determining a payment amount associated with the text message and debiting a payor account for an amount corresponding to the amount of the payment request, and crediting an account of a payee that is independent of the computer server system. The text message may be in the form of an SMS message. The method may also comprise associating identifying information extracted from the text message with an account of the payee at the computer server system. In addition, the payment request may include information identifying a payee account.

In some implementations, the method can further comprise comparing the amount of the payment request to a maximum payment amount and canceling the debiting of the account if the amount of the payment request causes the maximum payment amount to be exceeded. The maximum payment amount can also be the sum of a plurality of payments. In addition, the method may comprise authenticating identifying information for the payee before authenticating identifying information for the payor, and can also comprise obtaining payment from a financial institution with which the payor has an account.

In yet other aspects, the method can comprise transmitting to a device of the third party a text message indicating the crediting of the third party's account, and may also include initiating a telephone call to a telephone associated with the payor and seeking secure confirmation of the payment. The telephone call can be initiated if the transaction amount exceeds a defined monetary value or creates an excessive fraud score. In addition, the method can include placing the payment in escrow and crediting the account of the payee only after escrow conditions have cleared.

In another aspect, a computer-implemented method of initiating a payment transaction is discussed. The method comprises receiving at a computing device an identifier for a payee, receiving at the computing device a transaction amount to pay the payee, and transmitting to a central payment processing system a text message containing information reflecting the payee's identifier and the transaction amount. The method can further comprise displaying a transaction entry form on a display of the computing device, the form having locations for entering the text message identifier and the transaction amount. It may also include automatically inserting a text message identifier for the central payment processing system in the text message, or receiving a transaction verification text message from the central payment processing system and displaying all or some of the message.

In yet another aspect, a computer-implemented method of effectuating electronic payments is discussed and comprises registering a first user with a computer-based payment system, registering a second user with the computer-based payment system, and causing the transfer of funds from the first user to the second user in response to receipt of a funds transfer text message. The funds transfer text message may be received from a device having an identifier associated with an account for the first user. Also, the transfer of funds may comprise debiting an account of the first user and crediting an account of the second user. In addition, the method may comprise sending one or more text messages to the first user or the second user confirming the transfer of funds. The funds transfer text message and the confirming text messages may also be SMS text messages, and the transfer of funds can comprise communicating a funds transfer message to a financial institution independent of the computer-based payment system.

In yet another implementation, a system for managing financial payments is disclosed, and comprises a text message interface configured to receive payment requests from remote text messaging devices, an accounts database to stored information on a plurality of user registered with the system, and a transaction module in electronic communication with the interface and the accounts database to transfer funds from a first registered user to a second registered user in response to a text messaged payment request. The text message interface may comprise one or more servers having message parsers to extract payment commands from received text messages. The system may also comprise a transaction rules database containing rules that set amount-related limits on transactions.

The inventions described here may provide one or more of the following advantages. Users of mobile devices may be provided with a convenient method of making payments, including when they are far from home, a banking institution, or a cash machine. Users may make micropayments without the overhead of other payment systems. Person-to-person commerce may be aided, so as to permit electronic transactions instead of cash transactions. As a result, users may be able to make transactions without the need to plan ahead and carry cash with them. Tracking and reporting of transactions may also occur, so that users can more easily summarize activity in their financial accounts without extensive manual bookkeeping operations. Transactions may occur that would not otherwise be trustworthy or safe using cash.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7A shows a screen shot for reporting and management of an account with a payment system.

Like reference symbols in the various drawings indicate like elements.

DETAILED DESCRIPTION

Figure 1A:
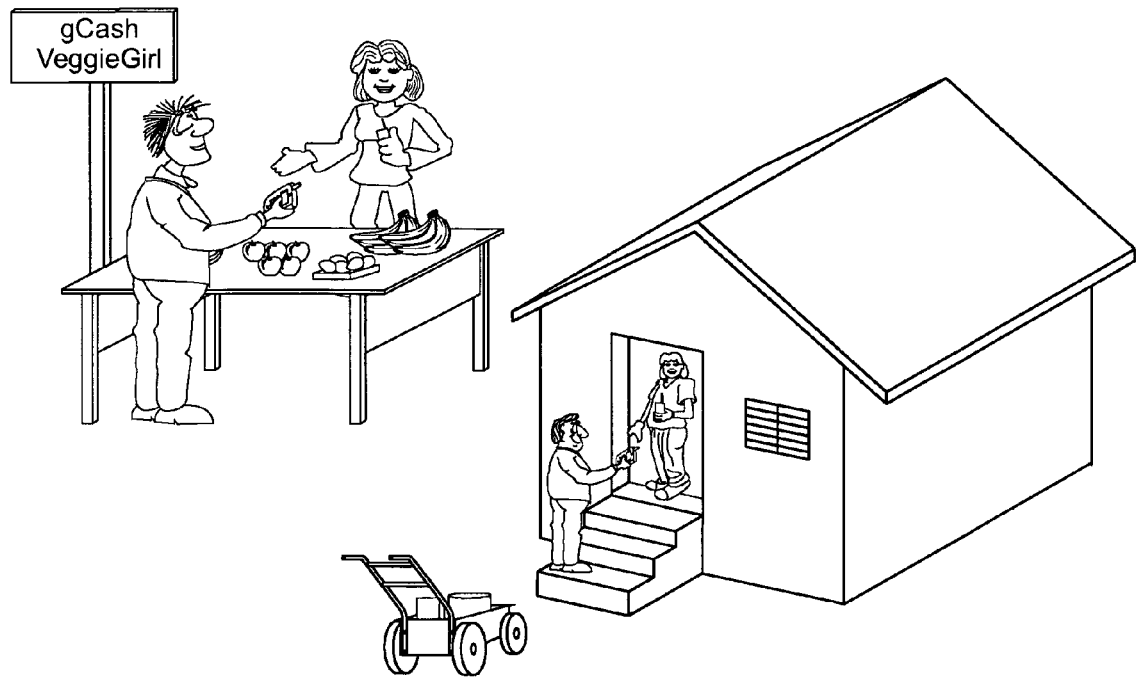
FIG. 1A shows three scenarios in which electronic payments systems may permit payment from a payor to a payee.
Figure 1A:
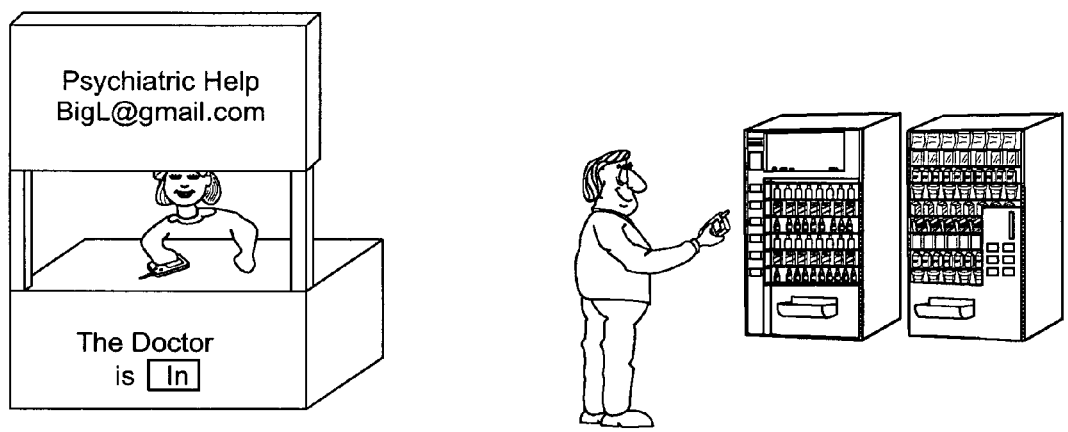

FIG. 1A shows five scenarios in which electronic payments systems may permit payment from a payor to a payee. The first scenario shows a farmer's market or flea market. At such markets, the vendors or sellers are typically individuals or families selling relatively low-price products. For example, a vendor may sell fruit for less than five dollars. Such a vendor typically takes only cash payments, because credit-card processing equipment is expensive and hard to attach outdoors.

However, such a vendor is also likely to have a cellular telephone or similar mobile device. That is because the vendor is entrepreneurial (otherwise, they would not get up at 5 a.m. to pick vegetables), has an income from his or her work, and also needs a means to communicate when they spend full days working at the market. The vendor may also not want to deal solely in cash. For example, at the end of a long day, the vendor may not want to have to deposit money at his or her bank. Also, some customers may approach the market with only a limited amount of cash. Because the market is outdoors, and perhaps away from traditional commercial districts, a cash machine may not be nearby or even convenient to find for shoppers. As a result, a vendor may miss an opportunity for some sales if it accepts only cash.

Thus, the figure shows a way to pay without cash by a customer having a mobile device such as a cellular telephone or smart phone, conducting a transaction with the vendor, who also has a mobile device. Both devices are wireless, so that they may communicate easily in almost any area. The vendor may have an account with an on-line payment service, and may have been assigned an identifier (or may have chosen an identifier), by which the person is known by the system. In the figure, the vendor calls herself "veggiegirl." She may post this identifier somewhere near her booth, along with displays (such as logos) that show shoppers that the identifier relates to the particular on-line payment service. Alternatively or in addition, the identifier may be the vendor's cellular telephone number or other similar text messaging identifier.

Accounts as discussed here may include an account with a central payment system such as a micro-payment system. They may also include bank accounts, such as accounts from which a central payment system may deposit or remove funds. In addition, the account may be a credit or debit account, such as an account relating to a credit or debit card. Also, although may examples here involve small payments, the size of the payment and the type of goods or services handled by the payment can vary widely. Although limits may be appropriate in certain cases, such as for security measures that a user or the system may impose, in other instances, such limits may be increased or removed.

A shopper may then select products from the vendor's display, and may enter an SMS text message directed at the on-line payment service. The message can contain the vendor identifier and a transaction amount. The transaction may occur while the vendor packages the goods, and the on-line payment service may text message a confirmation of the transaction to the vendor.

Once the vendor sees that she has received the money into her account, she may hand over the goods. If the vendor thinks there is something fishy about the message, e.g., that the buyer has found a way to "spoof" the payment system, she may separately log onto the payment system (e.g., by making a telephone call, sending a separate text message, or using a mobile web browser) to confirm that the transaction occurred.

Because the vendor initiates such a transaction, e.g., using her web browser, she can feel assured that she is receiving information from the correct source, and is not getting a message that is an imposter for a legitimate message from the payment system.

The scenario on the lower left corner of FIG. 1a shows that such a process and system may be used with respect to services also. Here, a young lady has established a street-side stand offering psychiatric help for a nickel. She is a sharp businessperson, and so has convinced one of her parents to loan her their wireless personal digital assistant (PDA), on which she can calculate her fees (e.g., hourly rate multiplied by time spent), and receive notification of payment. The device may communicate over a network like a digital cellular network or WiMAX network, or using WiFi back to her parent's house (in front of which she is sitting), and on through a wired broadband connection (e.g., DSL or cable modem).

Also, the system may help her organize her business with various reporting and analytics capabilities, which are described more fully below. For example, she may view payments grouped by client to see how much particular clients have paid and when they have done so. She may also analyze payments by time, so as to determine that her services are needed at a particular time of day (e.g., as people get off work) or a particular time of the year (e.g., during and after the holiday season). She may also obtain reports of total revenues for purposes of preparing her income taxes, and may organize payments as involving goods (on which sales tax may be due) and services (which may be exempt from sales taxes).

Like the vegetable vendor, the girl may post a sign indicating her association with the on-line payment system, and her identifier for such a system. She may also post two identifiers—one for the sale of goods, and one for the provision of services. Such a separation may permit her, for example, to separate sales on which sales tax may be due from those on which it would not. In addition, two vendors may want to share a single booth (such as to save money) and could book sales through two different numbers (with the ability of one person to handle all sales while another is absent). In short, such an approach would allow effectively for two "cash registers." In the pictured example, the service provider may provide for a recurring service also. In such a situation, users may be able to call up information on prior payments and simply repeat those payments, similar to using an auto re-dial on an SMS-capable device.

Such a feature may also be useful where small daily purchases, such as coffee, are involved. An approach like that could speed service in such a setting, and a vendor could offer discounts or other benefits to users of such a system in exchange for speeding the process. In a food processing environment, such an approach would be beneficial, as workers would not need to handle cash, and instead would merely need to look at a screen (or listen to a speaker) that would confirm that a transfer of money has been made. As such, the worker could stay engaged in preparing products rather than jumping back-and-forth from preparation to money transfer.

In such an environment, payment may be made over a wireless connection, such as by a text message, while confirmation to the payee may be made in a variety of manners. For example, all payment transaction for a single company may be sent to a central location via wired connection. The transactions may be communicated via a message formatted as a text message, as an XML document, or in other appropriate manners. The central location may then act on the message or route it so that the appropriate store or franchise can act on it. For example, the company may have a central accounting system that books the sale, and may send the confirmation message from the central payment system or another confirmation message through the internet to the relevant store where the confirmation may be communicated to staff there so that they will release the products or services.

The appropriate location to receive the information may be identified in a variety of manners. For example the original payment message may include a store identifier (e.g., "gpay Starbucks357 3.50" or "gbuy McDonaldsFresno5 8.53") or the location may be implied, such as by determining the location of the device sending the payment request (e.g., for GPS-enabled devices).

In addition, verification and other security measures may be implemented with the transactions. As one example, transactions may be limited to a certain dollar amount, or total transactions for one day may be so limited. For example, a user (e.g., through an on-line process with an internet web browser) may choose to limit text message transactions to five dollars each, with a daily maximum of twenty-five dollars. The user may also place temporal and geographic limits on the use of their account. For example, the user may prevent the device from being using during the night time (e.g., if the user stays home at night), or from being used outside the user's home town or home country (e.g., if the user does not travel much). Other variations may be chosen by a user, such as use in certain countries (e.g., the United States and Canada).

In addition, the user can limit the account to certain types of transactions. For example, vendors may register themselves using industry codes, and a user can register their account to do business with certain codes, or to not do business with others. For instance, a user may decline to do business with on-sale liquor establishments (e.g., bars) or cigarette sellers. Likewise, a user may decline to do business with particular other users or classes of users based on other categorization techniques. Vendors can be encouraged to report their codes accurately by providing transaction protection for vendors who do so. For example, if a transaction occurs on a stolen account and the vendor has not registered properly, the vendor may be required to cover all or part of the transaction cost. Such account parameters may be established by a user, for example, by making selections on a user profile accessed by a wireless device or by a desktop web browser.

Verification may also be used to provide additional security. For example, information may be sent from a buyer's device to a vendor's device using local communications channels such as Bluetooth, IR, or WiFi communications. Such information may include a simple identifier for the buyer's device, so that the vendor may match that identifier with any identifier received from a central payment processing system. The information may also or alternatively include a photo portrait of the accountholder of the buyer's device, so that the vendor can confirm that the person in the portrait is the same person holding the device, and therefore that the device has not been stolen. The buyer's identifying information may also be displayed on the buyer's device, and the buyer may show the information, such as a portrait, to the vendor for identification. In such a situation the portrait (or other identifying information) may be displayed in a well known format, such as part of a program that is protected from hacking, so that the vendor can have an assurance that the holder of the device did not simply mock up a fraudulent image for display.

In addition to confirming the buyer's identity in concert with information from the payment processing system, such short-range communication may also supplement communications from the central network. For example, if the text messaging network is suffering from extreme latency, so that messages are taking a long time to be transmitted, the short-range communication may serve as a confirmation apart from any match to information received by the vendor from a central payment processing system. For example, the buyer's device may transmit a message directly to the vendor's device that indicates the buyer has made a request for money to be transferred.

In addition, behavioral profiles may be generated for users, as is commonly done for credit card fraud detection and protection. Such profiles may reflect, mathematically, the sorts of transactions carried out with respect to a particular account. Uncharacteristic behavior may result in a "referral" of a transaction to a customer service representative to investigate the activity, or in an automatic follow-up process.

Follow-up may comprise alternative modes of contacting a user of a device. For example, where a central payment system determines that confirmation of a user's identity is needed (e.g., a transaction exceeds a set amount, or the user's behavior contrasts with a behavioral profile for the account), the system may dial the device and seek identifying information from the user. For example, the user may be asked to enter a personal identification code (PIN) that should only be known to the legitimate user of the device, and should not be obtainable easily off of the device. Other appropriate approaches for confirming a user's identity and for providing security for transactions may also be used.

A third scenario in FIG. 1A shows a young person seeking to perform a lawn mowing service for a homeowner. In this scenario, the young person can provide a payment number (e.g., by manually speaking the number or by sending it wirelessly to the homeowner) to which the homeowner can send payment. In the scenario, the quality of the service may vary, so that the homeowner may be wary of hiring the young person. The young person can, in such a situation, offer to permit escrowing of the payment. In other words, the homeowner (the buyer or payor) may choose a payment option that allows the transferred finds to be held until an event occurs that permits clearance of the funds. That event may simply be the homeowner sending a command to release the funds when the homeowner's lawn is completed satisfactorily. If the owner is not happy, however, he or she may refuse to release the funds.

Where a payor refuses to release escrowed funds, various dispute resolution approaches may be used. For example, a customer service representative may speak to the payor and payee to determine what happened and how the transaction should be completed. This representative may suggest solutions, or may also be given the power of an arbitrator. In another approach, the young person could take a cell phone photograph of the completed job and submit it to a referee or referees. The submission may also occur to a public forum, such as a web site, and the disposition of the escrow may depend on votes by visitors to the web site.

In a fourth scenario, a thirsty college student stands before a soda vending machine. The machine may be posted with a payment identification number, or may otherwise transmit such a number (e.g., via Bluetooth or RFID) to the student's wireless device. The student may then choose to transfer a set amount of money to an account associated with the machine. Also, where the student is not sure how much he or she will spend with the machine, he or she may leave the amount open, and allow the machine to provide feedback on the dollar value of the goods ordered so that the exact amount purchased by the student is removed from the student's account.

For example, a student may select a number of items from the machine, and then may be prompted to approve the transaction (with the total value, e.g., transferred from the machine to the device via Bluetooth connection) before money is transferred. Other communications features, like those discussed above, may also be employed. For example, short-range wireless links may be used to confirm for a machine the identity of a nearby user, and that identity may be matched with identification received from a central payment system. In such an approach, the cash transfer may occur without a transmission from the buyer to a central payment system; rather, the buyer may transmit certifying information to the machine, and the machine may then submit a request for payment to a central payment system. In this manner, any fees that the buyer might otherwise incur for carrying of a text message may be avoided.

A similar approach may be taken, for example, with respect to "honor" systems. One such system is shown in the fifth scenario, which shows a community stamp box, by which members of the community (e.g., employees of a company) may obtain an item of value or a service, and may deposit money for the item of value or service. Another common honor system is a community candy box or bagel/doughnut fund. Workers in the office may be trusted to take candy or stamps from such boxes, and a member of the organization may be tasked with periodically collecting and counting money left in honor boxes. A central payment system may relieve such a person from any work, as users may simply text message their honor contributions to a pre-set text message address. A similar approach may occur with respect to charitable contributions, i.e., users of messaging devices may direct a central payment system to transfer funds to an account associated with a charity. In such a situation, payees may also identify themselves as tax-deductible organizations, and reports generated by a central payment processing system may be used to establish the existence of a donation for tax purposes.

Figure 1B:
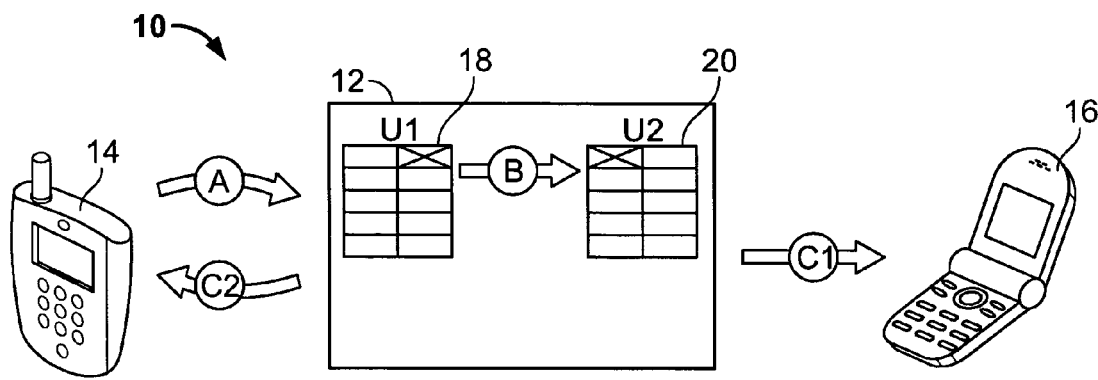
FIG. 1B is a schematic diagram showing the flow of messages in a payment system.

FIG. 1B is a schematic diagram showing the flow of messages in a payment system. The messages are marked with letters to show an exemplary order for generating and sending the messages. Such a flow may, in appropriate circumstances, be used in the scenarios just described. Other orders of messages, and additional messages may be generated as is appropriate or necessary. As shown in the figure, User1 is a device 14 associated with a central payment system 12. The device may be, for example, a cellular telephone, smartphone, or personal digital assistant (PDA). The identification of device 14 with a particular user, may simply be by association with an account at the central payment system 12 that belongs to the user. The connection between the device 14 and the account may be made in a number of ways. For example, a login process may require a user of the device 14 to enter an ID and a password—along with an identifier for the device (such as a telephone number). The connection may also be established by the central payment system 12 by analyzing a message received from device 14, such as in the header information of a text message.

In a first message, device 14 may transmit a command to central payment system 12 to effect the transfer of funds from the account of User1 to another account. The message may be generated as part of a simple text message having a predetermined format or formats entered by the user. The format may take, for example, the following format:

"gpay"<optional space><recipient phone or other ID><mandatory space><dollar amount>

For example, the user of device 14 may want to send twenty dollars to a friend whose mobile number is 850-555-1212. The user may thus type and send the following text message:
gpay 8505551212 20
to the Google text message address of GOOGL (46645), or to another address.

Figure 7B:
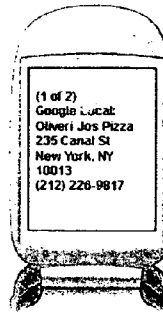
FIG. 7B shows a screen shot of a welcome page explaining features of Google SMS.

The initial term ("gpay") indicates to the receiver of the text message that the message is intended for a payment system. Thus, when the message is received by the system and initially parsed, the general text messaging intake system can quickly determine that the message (or information from the message) should be forwarded to the payment system. (Other incoming messages, from which payment messages are sorted, may seek driving directions, search results, or other information, as indicated in FIG. 7B.) Where the text messaging intake address is dedicated to payment, such an identifier would not be necessary. Likewise, the format of the message may indicate to a messaging intake system what service the message is intended for.

When the message is received, it may be parsed apart, and the relevant content may be extracted, stored, and/or analyzed. The parsing may occur in the main messaging system (e.g., in a front-end system) or in the central payment system (after the message has been forwarded). Information about the sender may be obtained, e.g., from the message header, and may be used to identify an account 18 of User1 to be debited. As shown by Arrow B, when the User1 account is debited, a corresponding account 20 is credited for the user identified in the message (User2), i.e., money or another measure of value is added to the account.

Although we speak of "funds" or "money" transfer in this document, we do not mean to limit such transfers to cash or cash equivalents, though such representations of money would generally be part of one implementation of the system. Rather, points or other representations of value may also be included under the identification of funds or money. Also, indirect transfers of funds or money are also contemplated, so that various payment schemes may be used to match the payment or receipt methods preferred by particular users. For example, one user may choose to have an account directly with a central payment system, while another user may prefer to have an account with a third party, to which the central system (which would be part of the larger payment system that includes the third party) could transmit funds. (The central payment system may itself have an account or other relationship with the third party for making such transfers.)

The amount credited and the amount debited can be different amounts. For example, a processing fee may be deducted from a transaction or added to amounts taken from User1's account. Other fees may also be assessed to various accounts, either in association with a particular transaction or otherwise (e.g., for penalties, withholding for taxes, or for other services). The terms of such fees or withholdings may be agreed to by the parties, such as when users initially open accounts, methods for which are well known in the art.

Once the central payment system 12 has reflected the transaction in its accounts, it may send notification messages out to the parties (or to one of the parties). For example, Arrow C1 shows a message, such as an SMS text message, sent to device 16, which has previously been associated with User2 (e.g., by User2 setting up an account with the system 12 that identifies an identification number associated with device 16 as the user's number). The confirmation message to device 16 may take any appropriate form. For example, the message may be in the form of a simple text message indicating that a certain amount of funds have been added to User2's account. The message may also include text allowing a confirmation, such as a URL that User2 may use (e.g., by clicking) to be shown a web page that allows more detailed follow up for the transaction. For example, the address or name of the sender may be obtained at such a site (if such information was not already sent with the confirmatory message). Also, an image relating to User1, such as the user's portrait may also be provided to User2, either in the confirmatory message or in later follow-up steps.

The confirmatory information may also be limited, such as for security purposes. For example, user information about User1 may be withheld from User2 so as to prevent User2 from learning more than is necessary about User1. For example, central payment system 12 may prevent User2 from obtaining the identification (e.g., telephone or SMS number) for User1. In one example, only the fact that money has been added to User2's account may be made known to User2. In many situations, that should be all that is needed to satisfy User2 so that User2 releases any goods or services to User1. In other situations, User2 may be provided with an image of User1 so as to make an identity check. And as noted above, short range communication between device 14 and device 16 may also be used for confirmation.

A confirmation message may also be provided to User1, as shown by Arrow C2. Where User1 can be confident that the transaction occurs properly (e.g., by being handed the goods, and by knowing that the system 12 will not overcharge User1's account), the confirmatory message may be omitted. The confirmatory message can also be provided to serve various roles. For example, the message may simply report to User1 that the transaction has occurred. The message may also identify the amount that has been debited from User1's account, e.g., the amount of the transfer request plus a transaction or other fee (e.g., so that User1 can know the full cost and/or so that User1's device can add the transaction to an internally tracked total). In addition, the message may seek further input from the user. For example, where a fee is added to the transaction, the confirmatory message may seek approval from the user before the transaction is carried out.

Also, the message may seek approval from the user to release information to the vendor, such as identifying information where the vendor has sought such information as a condition to releasing the goods or services. Similar follow-up may also be required if the parties agree to escrow payment, as described above. User1 may also be asked if he or she is willing to release personal information so that the vendor may provide follow-up information. For example, the vendor (User2) may want to send User1 promotional information, such as information about sales that the vendor may have in the future. User1 may also be interested in receiving such information, such as when the vendor provides a unique good that User1 otherwise has trouble locating. The central payment system 12 may then allow the vendor to assemble a mailing list of sorts for customers who expressed interest in receiving follow-up information. For example, such a process may enable a vendor of rare vinyl albums at a swap meet to notify eager customers when new titles have been obtained in the vendor's collection.

In some situations, User1 may be someone associated with the actual buyer, but someone not in the area of the transaction. For example, a parent may provide their teen child with a cellular telephone that has limited functionality, e.g., a limited selection of outgoing (and incoming) telephone numbers and a limited selection of outgoing (and incoming) text messaging addresses. The parent may also impose restraint on the child's spending with the telephone. For example, the child may go to a movie theatre and send a properly formatted text message to the parent, to pay for a particular movie. (The information for the text message may be entered manually by the child, obtained from a web site such as a site maintained by the theatre, or from a short range communication from the theatre.) The parent may then approve or disapprove the message. If the parent disapproves, the child must find something else to do. If the parent approves, a text message or other message may be forwarded to the central payment system 12, for example, by the parent's device or by the child's device. Upon receiving notification from the system 12, the theatre may print an appropriate ticket and may give it to the child.

Such a process may provide varying levels of information to the parent. For example, the parent may simply be given information that the child needs a certain amount of money released to a third party. The parent may also be given information about the identity of the third party. For example, the parent may be given the ID number of the third party or the name of the third party (e.g., either directly through the text message or through a look-up, whether automatic or manually initiated, that uses the ID number for the third party).

The parent could also be given more specific information about the transaction, such as the good or service sought to be procured by the child. For example, the text message could include a product code (e.g., typed in or obtain by a scan such as a bar code scan with a user's device), which could be forwarded to the central payment system if the parent approves the transaction, and may then be forwarded on to the third party. The parent may see the product code, or a product description associated with the product code, before approving the payment. The third party could then provide the child only with the approved product or service. In this manner, the parent would get to know and control the movie the child is seeing.

Other similar supervised transactions could also be implemented, such as a child purchasing coffee at a coffee shop (with supervision of the amount spent and amount of caffeine consumed) or groceries at the grocery store. Reporting capabilities associated with the system 12 (described in more detail below) would also allow a parent to more closely track the amount of money being provided to and spent by the child—an electronically controlled allowance.

In addition, User1 may choose to pay multiple people using a single message. The syntax of the message sent by device 14 may permit for such payments, such as by stringing together multiple identification numbers. Thus, for example, where multiple vendors are sharing in a transaction, User 1 may divvy up the payment to them. As one example, where two vendors share a five dollar transaction 80/20, the message may take the form of:

gpay 8505551212#6123355070 4#1

The messages to begin a transaction may take a variety of forms in addition to those already identified. For example, an SMS text message to transfer funds may take the form of:

gbuy <SenderLogin> to <merchantLogin><optional $ symbol><amount> or, by example:

gbuy gwashington to tsunamirelief 100.3 to send $100.30 to an identified tsunami relief fund.

Such a syntax may also be shortened to omit the sender's identity if that identity can otherwise be determined from the message. Thus, a message to pay postage to an honor system may take the form of:

gbuy <merchantLogin><optional $ symbol><amount> or, by example:

gbuy postage 0.37

Other information may be optionally transmitted using syntactic suffixes after the standard identification and amount information (and the initial command may be omitted if the message is being sent to an address that only accepts payment commands). For example, an identifying string may be added for making payment in a crowded area, where there might be multiple wireless purchasers and the merchant needs to determine which buyer sent the funds. Thus, for example, a person purchasing a cup of coffee in a crowded shop may send the message gbuy starbucks456 3.5 wire-rim-glasses As a result, a screen in the Starbucks #456 restaurant may display the following: "$3.50 from rdodin @ wire-rim-glasses." The barista may use this information to conclude that the person in front of her in wire-rim glasses has paid via text message for their grande latte. If a person meets that description, the barista may call out "Grande Latte!," wait for the person in glasses to approach, and hand him or her the item. The barista will not need to handle money or otherwise move away from their work. If there are two people that meet the description, the barista may simply ask the person approaching to identify their identifier with the payment system.

Likewise, for transactions as part of a drive-through, a user may type:

gbuy inandout001 5.27 white Pontiac Bonneville

The syntactical suffixes may remain undefined by the payment system, and simply passed in a predetermined way to the payee. As such, each payee may establish their own suffixes and display the syntax for them, and users may thereby pass additional information to the payees. Also, where a vendor does not require a particular suffix, a buyer may place a suffix nonetheless as a form of transaction comment that may be reflected for the buyer in its payment history, much like a comment on a paper check. The comment may or may not be made available to the payee, and comments may be provided even where the payee uses a suffix, such as by placing the comments after the suffix. The user may later see the comment when reviewing his or her transactions on-line.

In this way, the system may be made extensible much like an application programming interface (API) allows extension of a standard software system. For example, a vendor may have the first "word" after the necessary payment system information represent a product identifier, and the second a customer identifier. In the fast food example, a message of "gbuy hardees401 6.25 7 yugo" would purchase value meal 7 for a user in a Yugo, so that the store would know to prepare that meal and hold it until a Yugo driver arrives or gets up to the window. Because service time in a drive-through is crucial, a restaurant may provide a carry-out area near the drive through to encourage regular purchases, e.g., a driver may text message an order when leaving work at lunchtime, and may pull into an area near the drive-through, where an employee can carry out that person's meal. The same may be true of walk-up customers, who may have their food ready at the counter. In such a situation, the user may also replace the price field with a blank (e.g., filling in all zeroes) when they do not know the price, and may then confirm payment after the price is sent back to them.

In addition, currency translations may be provided as part of a transaction. For example, a Canadian citizen shopping at a bazaar in North Dakota may instruct to make payment in a particular currency, e.g., gbuy recordseller112 US25 buying records The system may then make the conversion and provide a confirmatory message to the user to ensure that they want to have the appropriate amount of Canadian money removed form their account. The user may also waive such a confirmation, such as by establishing confirmation waiver in a user profile, or by providing an appropriate indicator in the text message that requests the payment. The system may also make such conversions automatically, such as when a user requests to make payment to an account using a different currency. The system may default to assuming that the user's request asks for payment in the currency of the payee (or of the payor, depending on the situation), or may use available location data about the user (e.g., GPS location data or cellular carrier information) to default to the currency local to the transaction.

Figure 2:
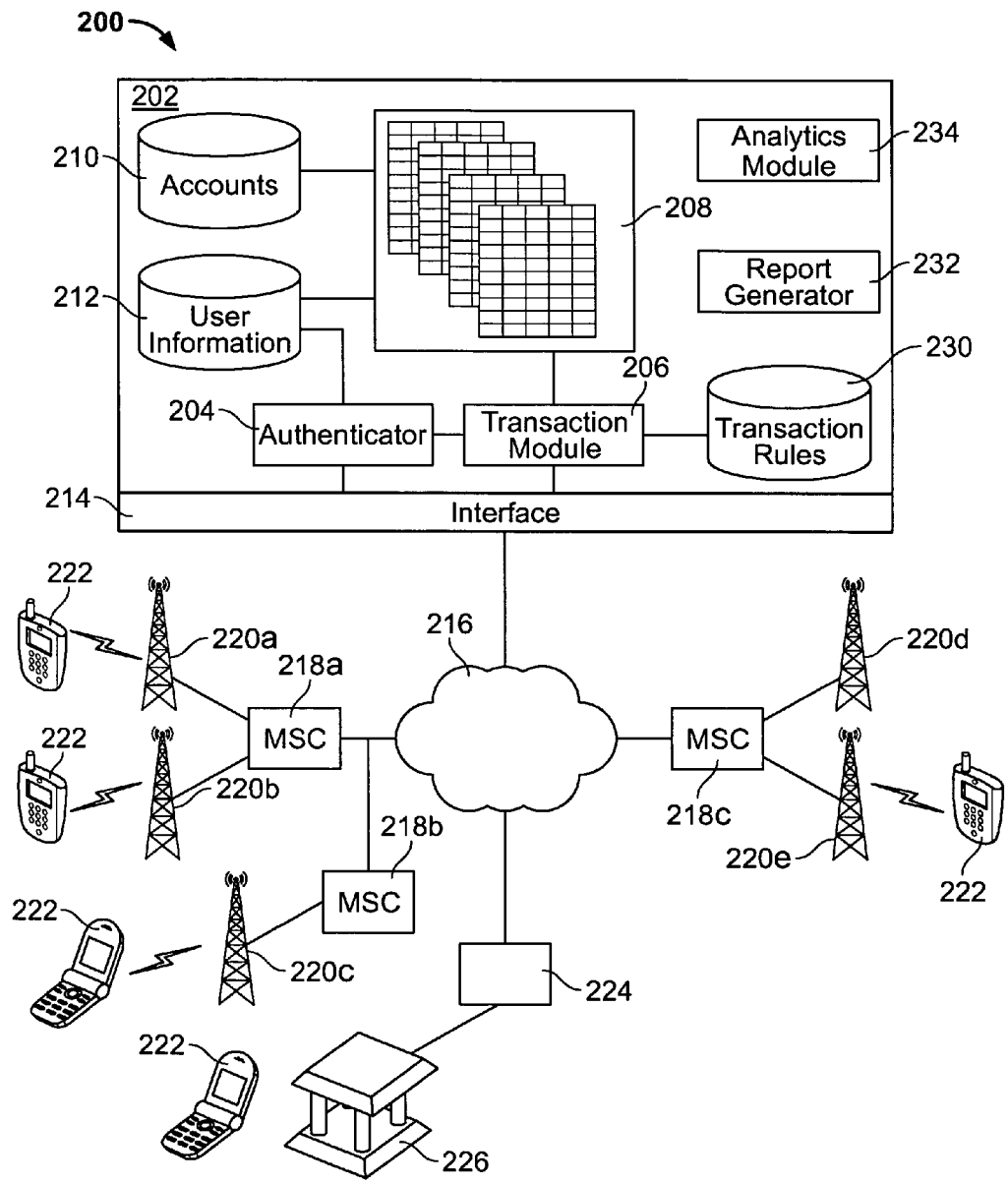
FIG. 2 is a schematic representation of a payment processing system.

FIG. 2 is a schematic representation of a payment processing system 200. This figure is more focused on the architecture of such a system, while FIG. 1b focused more on the operation of the system. In general, this exemplary system 200 may permit users of electronic devices, such as mobile devices, to transfer funds to users of other devices or other users registered with the system 200. Communications for carrying out and confirming the transfers may occur in whole or in part via simple means, such as via SMS text messaging. The system 200 may act on accounts internal to a single system, and may also act on, or provide fund transfers with, other accounts such as external bank accounts, debit accounts, or credit (e.g., credit card) accounts, among others.

The system 200 centers around a payment processor 202, which may be comprised of a number of server computers connected to a network such as internet 216. Payment processor 202 may include, for example, web servers, financial servers, and related hardware and software to receive and interpret orders for the transfer of funds, verify and carry out the transfer, notify parties to the transaction, and permit for various forms of analysis and follow-up.

Payment processor 202 receives messages from, and sends messages to, a variety of devices on a number of different networks. For example, mobile devices 222 of various forms may communicate using one or more cellular telephone data networks. The networks may take a typical form, including by communication through towers 220a, 220, 220c, in communication with various mobile switching centers 218a, 218b, which may in turn be connected to a central telephone network (not shown) and to the internet 216. Other appropriate configurations of data networks, including wireless data networks, may also be used.

Separately, a financial services processor 226 may be accessed through a financial gateway or router 224. The financial services processor 226 may comprise servers or mainframes used by a financial services organization to carry out on-line electronic transactions, such as wire transfers and the like. Communications with financial services processor 226 may be encrypted or otherwise protected for security (as may other communications in the system). Although financial services processor 226 is shown connected to the payment processor 202 through the internet (which may be carried out with encryption and other similar features), it may also connect through a private network (not shown) to provide additional security.

Payment processor 202 may coordinate the transfer of funds from the account of, e.g., a user of one device 222 and another device 222, both where the devices subscribe to a common wireless network and where they do not. Payment processor 202 receives and sends messages through interface 214, which may be comprised of one or more web servers and/or text message servers.

Payment processor 202 may be part of a larger information service provider system that provides services in addition to payment processing, such as search services, mapping, e-commerce, web content delivery, and other on-line services. Thus, interface 214 can be provided with structures for identifying messages relating to payment processing and properly routing such messages or information from such messages. For example, the larger system may accept any sort of SMS text message, and may be provided with a parser to break messages into pieces that can serve as variables for later actions relating to the message. In addition, the parser may obtain information from the text message header. Suitable parsers are well known in the art.

Information from messages that have been identified as being payment-related messages may be forwarded to an authenticator 204. The authenticator 204 may draw upon a database of user information 212 to check whether information identified in the incoming message is accurate and can be acted upon. For example, the authenticator may receive an identifier for the sender of the message (e.g., a prospective payor) and for the recipient of a payment, such as their SMS identification numbers. The authenticator may then search the user information 214 for matches for both users to ensure that they have active accounts with the system. A user may also have an account with the system 202, but have some or all privileges suspended; in such a situation, the user information 212 would include an entry for the user, but could have a field or fields indicating that certain transactions with the user are prohibited (e.g., the user may receive money but may not spend it). The authenticator may, in certain circumstances, also conduct follow-up actions, as described more fully below.

If the prospective users "check out" in the authenticator, the transaction may be passed to a transaction module 206 which is responsible for effecting a funds transfer, and for confirming the transaction with the users. Transaction module 206 may draw upon transaction rules 230 in carrying out the transaction. The transaction rules 230 may be general, e.g., setting forth a maximum amount that the system is willing to handle in a transaction or in a single day for a user. The transaction rules 230 may also be user-specific. For example, a vendor may choose to establish its account to only receive payments, and not to provide payments. Likewise, a user may place other limitations on its account, such as a maximum per-transaction cost, a maximum per-day cost, a limit on the types of products that may be purchase or the types of payees to which payment may be made (e.g., blocking payments to bars or adult service providers), or a limit on the time when transactions may occur (e.g., no transactions after 10 p.m.).

In addition, a user or the system may require certain forms of verification for some or all transactions. For example, a user may be willing to be prompted with a password (or to provide the password in the initial text message) for all transactions, or transactions that exceed a certain dollar amount. Where the transaction module 206 identifies a need for verification, it may pass the verification duties to the authenticator 204 or handle the verification itself. Such verification may include, for example, sending a text message that asks for a PIN number, waiting for a response, checking received responses against outstanding requests, and checking the PIN against a stored PIN number for the user.

When prerequisites for a transaction have cleared, transaction module 206 may effect changes in a ledger module 208. The ledger module 208 serves as a space in memory by which changes to accounts 210 are made. Specifically, the ledger module 208 permits debited of one account (e.g., the payor's account) to remove funds from it and the crediting of another account (e.g., the payee's account or a system account to cover transaction fees) to add funds to it. The ledger module 208 may also draw upon user information, e.g., to identify user identification numbers to locate user account values. In addition, the ledger module 208 may provide feedback to the transaction module 206, such as to indicate that an account does not contain sufficient funds. (The transaction module 206 may also make such a determination initially as one of the prerequisites for moving forward with the transaction.)

When the accounts have been affected, the transaction module 206 may then cause confirmatory messages to be sent to the user devices 222. As noted above, such messages may include a text message to the initiating payor indicating the amount that has been deducted from the payor's account. The messages may also include a message to the payee indicating the amount that has been added to the payee's account. Once the payee has received such confirmation, he or she may release any goods or services relating to the transaction. The messages may be generated by components in interface 214, such as an SMS server, under control of commands from transaction module 206, and using information passed from or under the control of transaction module 206.

Other modules may be provided with system 202 to provide features described more fully below. For example, analytics module 234 may include one or more applications or routines for analyzing data in system 202. Such analytics information may be made available to users of system 202, to operators of system 202, or to others. For example, users may be provided with data about other users with whom they have done business—including the provision of spending trend data, and information about other purchases the other users have made. For instance, a merchant or vendor could learn what other types of objects the merchant's customers have purchased, and the type of other merchants the customers have done business with. The merchant could use the information to analyze other types of goods the merchant may want to offer to its customers (i.e., to identify complementary goods).

Administrators of system 202 may conduct analyses across larger segments of data in the system. For example, analyses may be conducted to determine the time and locations of purchases so that, for example, the system 202 may be modified to handle higher volumes in certain locales or at certain times. The administrators may also package data for sale to other companies; for example, companies may be interested in en gross spending habits of consumers, e.g., to refine marketing messages for reaching out to such users. As one example, an energy drink maker may be interested in where and how various fitness-related purchases are occurring so that it may focus its attention on those circumstances.

Raw data may also be passed to third parties to allow them to do their own analyses on the data. In each circumstance where analysis is conducted on data, the identities of users may be hidden, using any number of well known methods.

Such analysis, along with other analyses discussed here, may also be conducted across information other than that relating to text message payments. For example, other payment information including other electronic payments (e.g., credit card or electronic money transfer) may also be included in the analysis. Transactions may also be correlated with other stored information, for example by providing a user who has started a transaction with data relating to the proposed transaction. For example, where a user begins a purchase but the product is available for a lesser price elsewhere (including within a certain distance of the user as determined by the location of the user's device), the system alert the user to the alternative source (which may be an on-line source).

Whether as part of the analytics information or otherwise, the system 202 may also use a report generator 232 to produce data summaries that are useful to users of system 202, administrators, or third parties. With analytics, a user may be provided with tables and graphs that summarize activity on their account, including in comparison to other activities by the users' customers. Reports may also be generated aside from particular analytics approaches. For example, each user may use a web browser (as shown in more detail below) to access system 202 and receive a chronological listing of transactions for their account. Other such reports may also be provided for users. Reports may include full statistical analysis of the data, including projections into the future based on past practices. The data, in addition to reflecting time of purchase, may also include dollar amount and frequency of purchase, the confidence level returned by a fraud engine, and metadata surrounding the transaction (e.g., location of the user).

Where location is tracked (e.g., using location-based services (LBS)), the location may also be considered as a factor by a fraud detection sub-system. For example, if a device does not "go to work" in the morning (as determined from past behavior) or go home at night, it may well be lost or stolen (if it is observed to still be in its original city, and thus not part of legitimate travel with its owner). If an attempt at a significant transaction is made in such a situation, the user may be e-mailed or an alternative number such as a land-line number (home or work) may be called to notify the owner. Also, where business information is geocoded, the location of a proposed location may be compared to the business location information to ensure that the purchaser is at the business. Such a consideration may also be a factor in a fraud detection. The user profile for fraud determinations may also be updated with information from each transaction.

Location information may be used in other manners, such as by using the location (determined, e.g., by GPS, cell tower triangulation, or short range wireless (e.g., Bluetooth) techniques) to determine a payee automatically. For example, if geocoded information about Disneyland indicates that a user is there, the syntax of a payment request could simply be <price> or <item, price>, e.g., "bagel 1.75" or "1.75". The system may then determine the payee information from the location. Such an approach may make transfers more convenient for the payor, and make service by the payee equally convenient.

Particular metadata about a transaction may also be obtained and analyzed (either at the time of a transaction or at a later time) for a transaction. For example, a Bluetooth API may be used with a client application on a device to take a snapshot of all other Bluetooth-enabled devices in an area so as to create a social context to a transaction. A camera API in a device may likewise be used to measure light levels in an area of a sale. Thus, data such as the following may be collected with a transaction: (1) amount of purchase; (2) identity of a merchant; (3) location of the user at the point of sale (POS); (4) co-presence of other users; (5) light levels; and (6) time of day. Such data may be correlated with other data in the system (e.g., knowledge of other user locations, ceocoded business information, and weather information). This information may be analyzed as appropriate to provide, for example, improved fraud prevention, directed promotional material, and per-user customization.

Biometric data may also be obtained for a transaction. For example, a user may place their thumb to a camera on a device. Alternatively, a vendor may have a biometric device (when such is too expensive or bulky for a buyer to have), and the information it obtains may be checked against information from the system to verify a buyer's identity.

As noted, metadata collection and user behavior profiling can be used effectively to minimize fraud in such a system. Such data may also be employed to better serve users in other ways. For example, greater personalization of service may be provided. For example, when a user makes an SMS payment, the payment information may be used to generate a very targeted advertisement such as "A neat accessory for the [product] you just bought, is a [widget] in aisle 12 of the Mr. Electronics store in which you now stand." Such an advertisement may be particularly helpful to a user, as it is aimed at something the user likely needs rather than being a generic broadcast of an advertisement.

Because mobile payment authentication may rely heavily on an assumption that a legitimate user is in control of the payment device, a quickfail system may also be provided to stop transactions if control over the device is lost. Easy connection to the system may also be provided so that users can quickly check the status of their accounts and shut the accounts down if there are any irregularities. For example, web access may be provided to the system (e.g., through a web browser and password-protected access) so that a user can immediately deactivate an account if their mobile device is lost or stolen.

System 200 may also provide for more direct banking operations, such as funds transfers and other payments in banking via text messaging. For example, a user may transmit to a bank SMS address a message providing an instruction, an account number or numbers, and an amount. As one example, a funds transfer may be formatted as transfer 0123456 6543210 375.23

In addition, transfers from one user's account to an account at another institution may be permitted, and comments may be allowed to accompany the transaction as a post-script. As one example, account numbers may be preceded by institution numbers:

transfer 1234-65656668 1323-7634323 35.50 comment

Figure 3A:
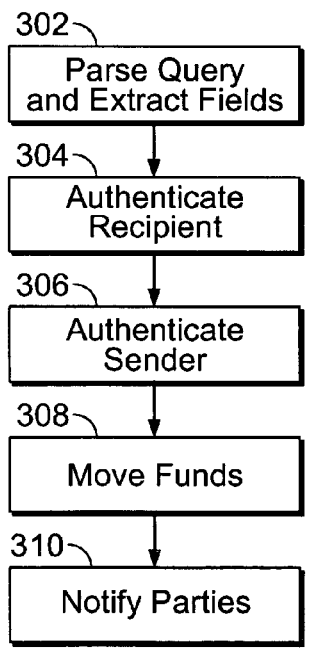
FIG. 3A is a flowchart showing actions in an exemplary payment processing method.

FIG. 3A is a flowchart showing actions in an exemplary payment processing method. The flowchart shows a simplified flow for clarity. In general, execution of each step may involve presuming that the prior step executed successfully, though it is not intended that the steps must occur in the order shown, or that all of the steps are necessary. For example, the sender could be authenticated before the recipient is authenticated, or funds could be transferred without authenticating the recipient, e.g., by escrowing the funds until the recipient has been authenticated (e.g., by completing a sign on process).

In act 302, a system first parses a query and extracts fields from it. The query may be previously filtered to ensure that it is of a type that can be used by the system. Specifically, the query may comprise an SMS text message, and may initially be checked to see if it is in the format of a payment message. Via standard or other appropriate parsing techniques, the various arguments in the message may be obtained, including by obtaining information from the message header. The obtained information may include a payment command, a recipient or payee ID, a payor ID, and a transfer amount.

At act 304, the recipient of the fund transfer is identified. The action of identifying may be as simple as comparing the payee ID against a list or lists of active users of the system. Other techniques for identification may also be employed as appropriate.

At act 306, the sender or payor is authenticated. Such authentication may occur in a manner similar to that for the recipient. However, because the payor needs to come up with the funds, additional steps may also be taken, such as to confirm that the payor's account has sufficient funds and to check a password or ID provided by the payor (or to seek confirmation from the payor). The sender authentication is shown in this exemplary flow as occurring after the recipient authentication because the sender authentication may be more expensive (e.g., in terms of system resources) to conduct, given the extra checks that may need to be made against the sender's account. In addition, senders presumably send their own data accurately more often than they send a recipient's data (e.g., because the data is intrinsically known to the sender, and may also be sent automatically in the header of a message), so that authentication of the recipient can be expected to fail more often than authentication of the sender. Thus, by authenticating the recipient first, a transaction may be more often stopped short, without the cost of extra steps. Such savings in computational cost can be significant for large-scale payment systems, including general micro-payment systems.

When sufficient authentication has occurred, the funds are moved (act 308). In a basic case, the movement may simply involve debiting the account of the sender and crediting the account of the recipient. It may also involve debiting one of the parties' accounts (or another account, e.g., if a party maintains a separate account for tracking usage fees) an additional amount and crediting an account associated with the payment service.

The parties may then be notified that the funds have been moved. The notification may comprise a simple SMS message indicating that funds have been added or removed, and the amount of the funds. It may also comprise an identifier for the other party, and information such as a hyperlink that permits follow-up by the users.

Figure 3B:
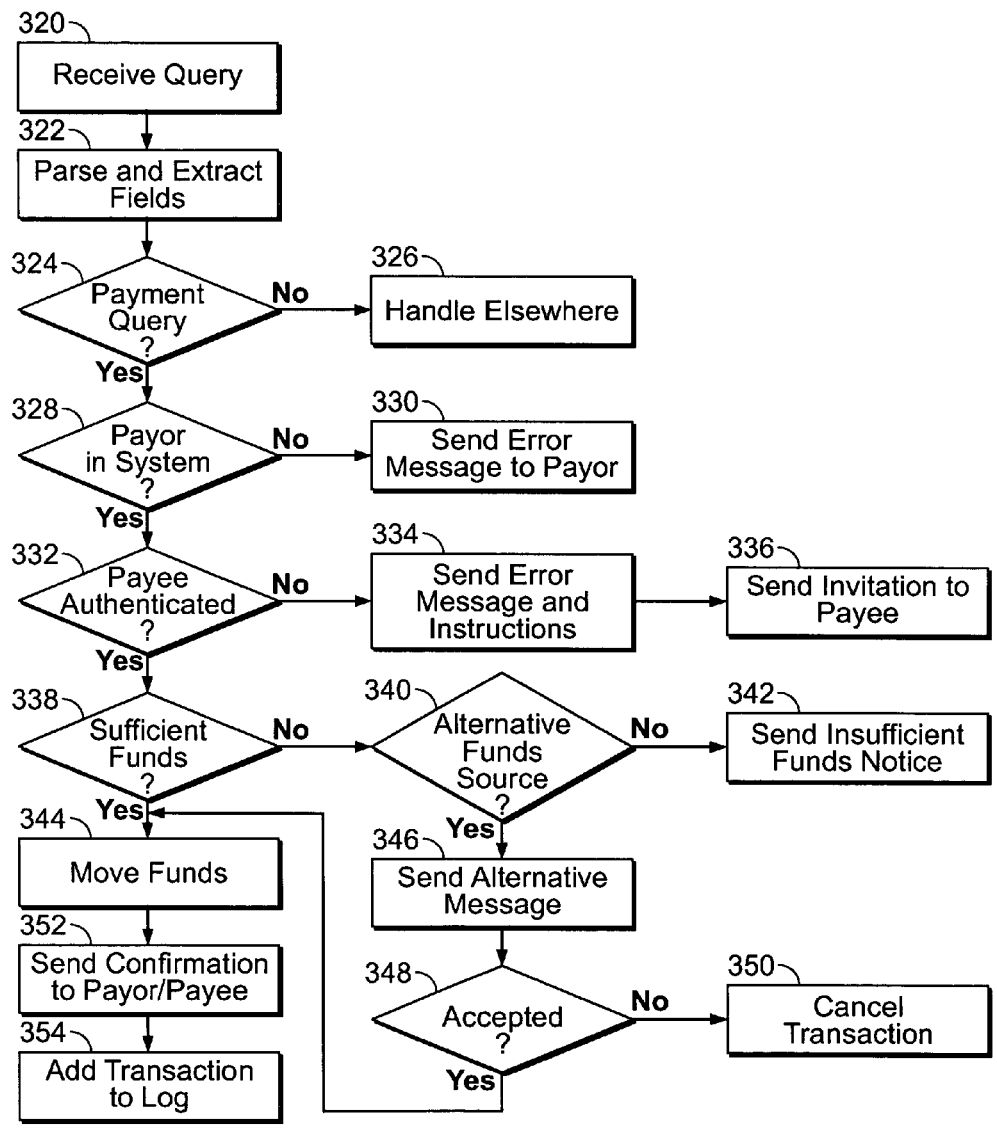
FIG. 3B is a another flowchart showing actions in an exemplary payment processing method.

FIG. 3B is another flowchart showing actions in an exemplary payment processing method. This flowchart shows a more detailed operation, including steps that may occur when there is an exception. At act 320, a query is received. As noted above, the query may be initially received by an SMS server that may classify and route it, or may be received by a server capable of recognizing and handling only a properly-formatted payment message.

The message is parsed and its fields extracted at step 322. The fields may then be stored in a preformatted data structure for further analysis, and potential transfer for more persistent storage. If the message is invalid or not a payment query (act 324), it may be forwarded to another sub-system (act 326), or an error response may be returned to the sender (e.g., using the sender's ID from the original message header as an address). The error message may indicate that the original message was not processed, and may provide a string showing the proper syntax for a payment query.

If the query is a valid payment query (e.g., a request to pay funds), the system may then determine whether the payor is a registered, active user of the system (act 328). This step may involve checking the ID number received with the SMS message against a list of active ID numbers in the system. If the payor is not, the system may send an error message to the sender (act 330). Such a message could be formatted as follows: "We couldn't find you in our records; sign up today at http://gpay.google.com." The message could also be formatted as: "You are registered with our system, but we are having difficulties processing your request; please visit http://gpay.google.com." The message may also be more general in case the user sent the request by accident.

The payee may then be checked in the system (act 332), and if the payee does not appear in the system (as determined, for example, by comparing the information in the payee identification area of the request message, to a list of valid and active payees) similar error messages may be dispatched to the sender. Alternatively, a generic message may be sent so as not to indicate to the sender whether the proposed recipient is or is not registered with the system.

Optionally, an invitation may be sent to the text message address of the proposed payee, inviting that person to register with the system. In such a situation, the sender's funds may be escrowed, and the message to the payee may indicate that the payee may obtain the payment (and may indicate the amount of the payment) by signing up with the system. The message to the sender may take, for example, the form of: "The owner of <recipient phone> is not yet registered; funds will remain earmarked until you cancel and/or he/she collects." Where funds are held, the system may also create an account for the recipient and assign it a password, and may provisionally assign any escrowed funds to that account, pending registration and collection by the recipient, or login and cancellation by the sender. Adequate safeguards may be employed to prevent senders from illicitly sending "sign up spam" and other such messages by guessing or otherwise determining the ID's of potential recipients.

The level of funds held by the sender may then be checked (act 338). This check may simply involve determining whether the sender has a positive funds balance with the system. Alternatively or in addition, it may involve checking an external account (e.g., a bank account or credit card account) for availability of funds. In addition, other checks may be run, such as a fraud check that may involve comparing the pending transaction against a profile for the particular user's earlier payment activities.

If the funds are not sufficient or the payment may not otherwise come from a primary source, the system may determine whether there is an alternative fund source (act 340). If there is not such an alternative source, the sender of the original query may be sent a message indicating that there are insufficient funds for the transaction (act 342). If there is an alternative fund source, that source can be accessed. In some implementations, the sender may be asked whether the alternative funds should be accessed (act 348), and if the sender agrees (act 348), the transaction may progress. If the sender disagrees, the transaction will terminate (act 350).

A similar approach with the user may occur if there are, in general, sufficient funds, but the transaction seeks to transfer more funds than is otherwise allowable. For instance, a particular user may have a rule that permits free and easy transfer for transactions up to three dollars, and may have thirty dollars available in their account. If the user seeks to transfer five dollars, there technically are sufficient funds, but the user's account may have restrictions that prevent free transfer of such an amount. In such a situation, the system may send a verification request to the user, and not carry out the transaction unless the user makes such a verification. The verification request may involve an electronic message, such as a text message, that asks the user for a password or PIN. (If the user knows that a request will require such verification, they could also include the password or PIN with the original query, and the system could look for such information before sending a return message to the user asking for verification.)

Alternatively, the verification may include a call the user's telephone, followed by a prompt for the user to key or speak a password, PIN, or similar entry. In addition, a voiceprint or other identifying characteristic of the user may be employed for such verification.

Also, the complexity of the verification may change with the amount of the transaction. For example, simple verification requirements may be imposed for low-value transactions. Alternatively, more complex, and perhaps multiple-part verification processes may be required for high-value transactions. Information from the verification, such as a digital recording of an oral approval by the user, may also be saved by the system for follow-up, e.g., if the transaction is challenged by the user.

When the prerequisites have been checked, the system may move the funds (act 344). This movement may occur as discussed above or in other appropriate manners. When the funds have been moved (or when the system is confident that the funds will be moved), the sender (payor) and payee may be notified (act 352), as discussed above, or in other appropriate manners. At act 354, information about the transaction is added to a transaction log. Depending on the needs of the particular system, the log may be a database containing information on a transaction-by-transaction basis. Alternatively, or in addition, transaction information may be stored for each of the parties to the transaction. Pointers from the parties' data may also be provided to a central transaction database. By whatever structure the storage occurs, the logging of transaction information may permit later analysis of transaction data, and the generation of reports for users or for others with access to the system.

Figure 4:
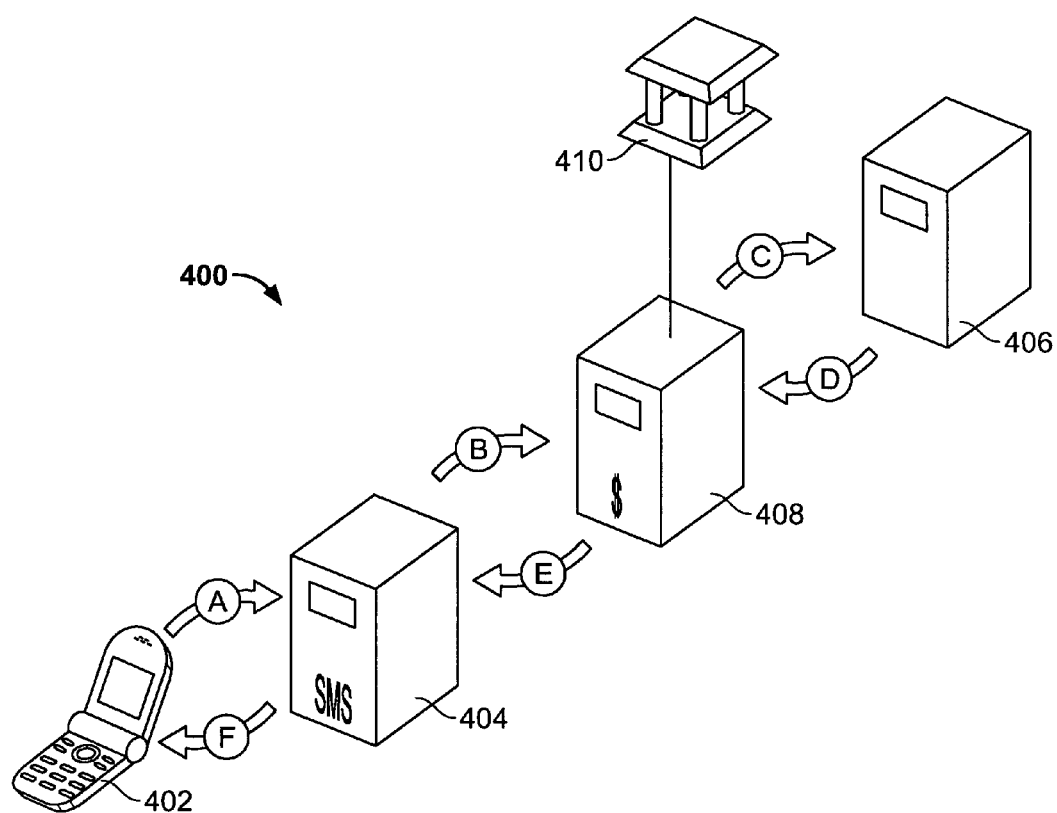
FIG. 4 is a schematic representation of certain sub-systems in a payment processing system.

FIG. 4 is a schematic representation of certain sub-systems in a payment processing system 400. This figure shows an exemplary "layered" system whereby elements at each layer perform a defined function and then pass information on, and receive information from, components in the next layer. In general, the system 400 is shown to comprise a mobile device 402 and a financial institution 410 connected by three server systems 404, 406, 408. In one implementation, the server systems 404, 406, 408 are operated by a single organization, and are broken up so as to let each system handle a focused task or tasks, and to serve potentially other systems at the other layers.

For example, funds server 408 may be a general funds server that is capable of managing and transferring funds between user accounts in a wide variety of applications, and may be not limited to text messaging-based payment. The funds server 408 and related features may also manage the "back end" processes for funds transfer and account set up. As such, a user may have a single account for all sorts of transactions, and may be allowed to enter a text messaging designation for text-message payments. The text message payments may then be carried out by the funds server 408 like other payments. (The payments may occur in a different manner, and may be flagged for later display so that a user can view reports showing text-message payments apart from other sorts of payments.)

Funds server 408 may be in data communication with one or more financial institutions 410 to help effect such transfers. For example, transactions handled by system 400 may be directly tied to external accounts with financial institutions 410, so that each time a transaction occurs, the user's account with the financial institution 410 is affected. As one example, the system 400 may execute a credit card charge against the account of a payor as soon as a transaction occurs.

Transactions with financial institutions 410 may also be more indirectly linked to transactions with mobile device 402. For example, a user may keep a positive balance with system 400 against which the user may take a draw during a specified time period such as a day. The financial institution 410 may then be accessed at the end of each time period to replenish the user's account. Thus, a user could conduct a number of relatively inexpensive transaction (e.g., less than one dollar or five dollars) throughout the time period, and have only a single (potentially much more expensive) transaction with the financial institution at the end of the time period, which rolls up all of the smaller underlying transactions. Typically time periods could involve daily or weekly updates. Also, smaller transactions may involve only access to a local account of a user, while larger transactions may trigger access to financial institution 410.

Funds server 408 obtains its information from multiple sources; the figure shows an SMS server 404 as an exemplary source. The SMS server performs syntactic analyses of incoming messages to verify that they are payment-related messages, extracts relevant fields in a parsing process, and hands the process (and the information) to the funds server 408. The communication between SMS server 404 and funds server 408 (and the communications between other components in the system 400) may occur through any appropriate manner, such as by remote procedure call (RPC), HTTP messages, or otherwise. Secure communications between servers 404, 408 may also be used where appropriate.

Funds server 408 may also send requests to user server 406, which may be configured to identify users of a system. For example, a user may initially create an account with a system to conduct a variety of actions with the system, such as obtaining e-mail, driving directions, financial management assistance, shopping, travel aid, and the like. User server 406 may store identification and verification information relating to each such user for later reference. Thus, funds server 408 may send information received from a user in a message to user server 406 for purposes of authentication. By separating the two processes in the manner shown in this exemplary embodiment, the user server 406 may provide authentication and other user information to a wide variety of services, and may serve as a single central source for such information.

In operation of system 400, the SMS server 404 initially receives a message, extracts its relevant fields, and passes one or more arguments relating to the fields (e.g., the IDs of the sender and recipient, and the amount of money to transfer) to the funds server 408. The funds server 408 receives the arguments and performs a lookup for authentication by calling user server 406 for such information. The funds server 408 may then perform other authentication steps, such as checking to ensure that adequate funds exist in an account, after which the funds server 408 will move the funds (e.g., by placing corresponding entries in the sender's account and the recipient's account).

The funds server 408 then calls back to the SMS server 404, indicating whether the transaction has been completed successfully, or identifying one or more problems with the transaction. The SMS server 404 then formats and sends a response to the mobile device 402, and perhaps to a device of the recipient. If the transaction completed successfully, the messages may include confirmation of the transaction, as described above.

Figure 5:
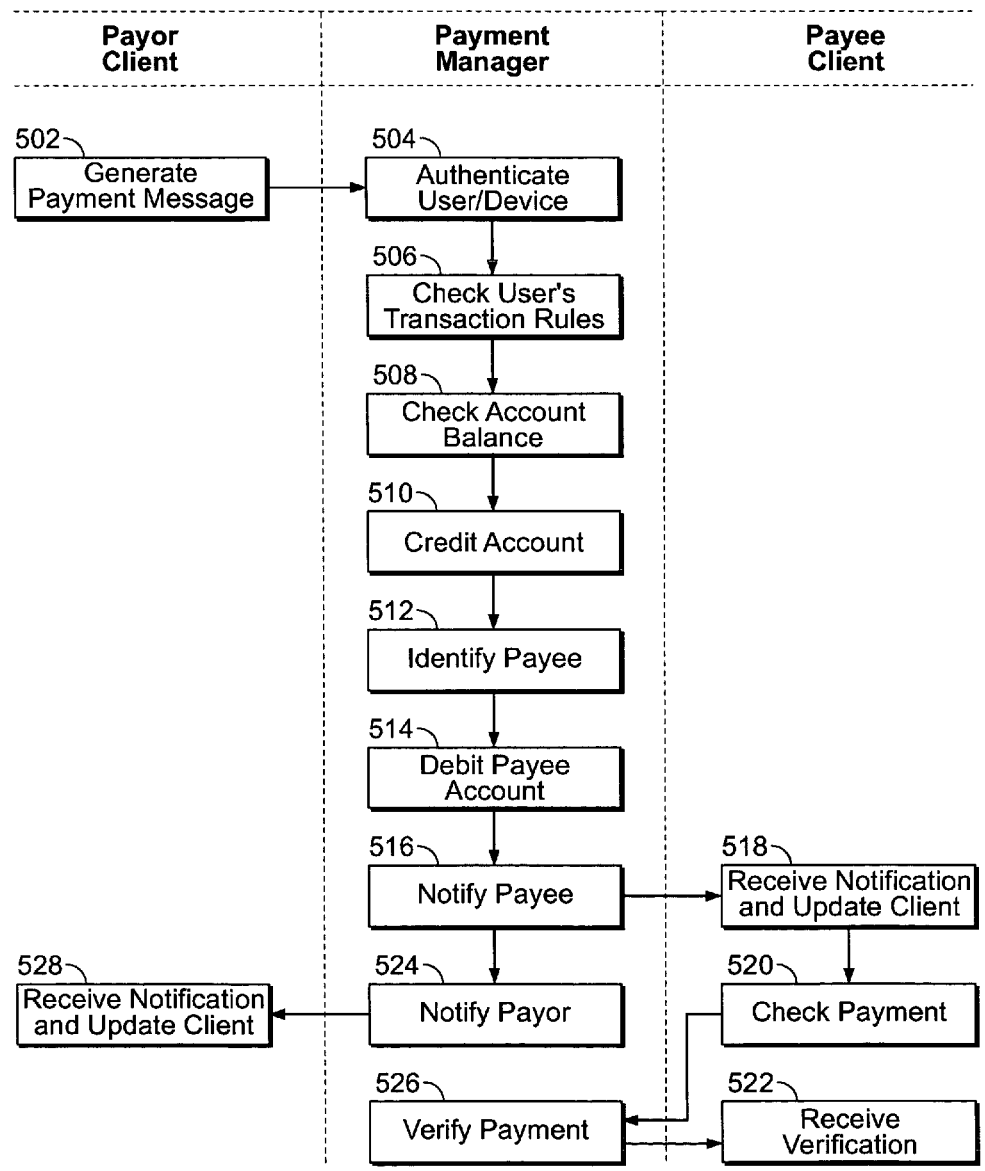
FIG. 5 is a swim lane diagram showing interactions between a payor and a payee, and a payment processing system.

FIG. 5 is a swim lane diagram showing interactions between a payor and a payee, and a payment processing system. The steps of the process here are similar to those in earlier-depicted flows, though FIG. 5 shows an exemplary assignment of tasks as between a payor's client, a payment manager in the form of a server system, and a payee's client. Again, the particular order of steps may be changed as appropriate.

In an initial act, the payor generates a payment message (act 502) to the payment system, identifying a payee and an amount to be transferred to the payee. The payment manager authenticates the device as being one associated with an account in the system, e.g., by performing a look-up of the identifying information in the message header (act 504). The payment manager may also check the sender's transaction rules, e.g., to determine whether the requested transaction can be carried out according to those rules, e.g., whether the transaction is for too large an amount. The overall balance of the payor's account may also be checked, or the availability of credit may be checked (act 508). If the payor's ability to pay is confirmed, the payor's account may be debited (act 510).

Identification and authentication of the payee may then occur (act 512), followed by crediting of the payee's account (act 514). The payment manager may then notify the payee (act 516) and the payor (act 524). For the payor, the notification may simply comprise a text message explaining that the transaction has completed, perhaps with a reminder about the amount of the transaction. The payor's client may receive the communication and update its own memory with information about the transaction (act 528), whether using information from the sent message or from the received confirmation. For example, the identifier for the payee may be stored on a "recent payees" list so that repeat purchase may be made more easily. The same is true for the entire query string. Thus, for instance, a user could easily repeat a purchase (e.g., a breakfast snack, or a cup of coffee) with minimal effort each day.

Where the payee is not willing to rely on mere notice of payment, the payee may follow up and check the payment (act 520). Such an action by the payee may be started from the notification message itself, such as by sending a responsive text message that requests additional information about a transaction or by selecting a URL sent with the confirmation.

The sending of a confirmation request may cause the payment manager to transmit a payment verification message (act 526), which the payee client may receive (act 522) and the payee may review. The verification may include, for example, a view of the payee's account so that the payee can check that the account has recently increased. In addition, the payee may see that his or her verification request is pointing to the right source (e.g., via an address in a web browser), so that he or she may conclude that the confirmation was not sent by an imposter.

Figure 6:
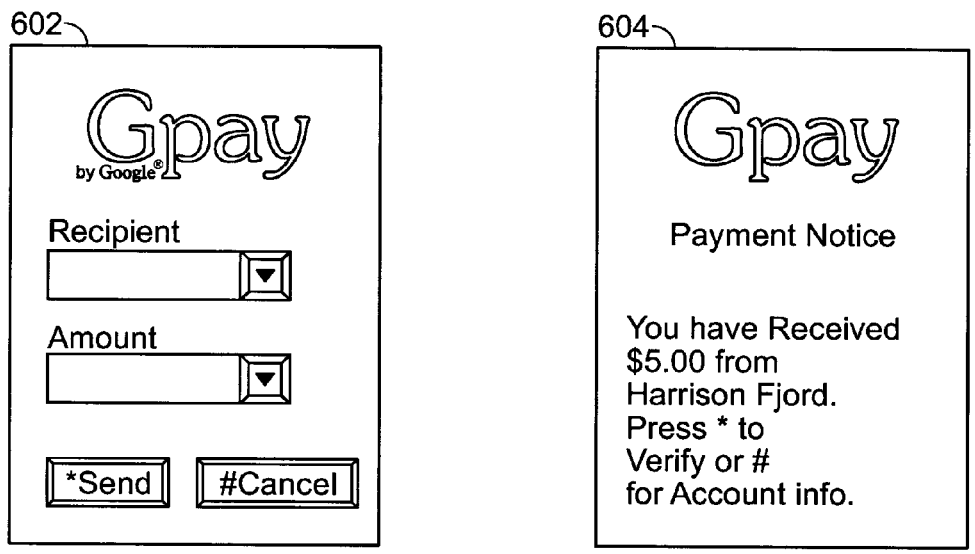
FIG. 6 shows exemplary screen shots for a payor and a payee using a text-messaging payment processing system.

FIG. 6 shows exemplary screen shots for a payor and a payee using a text-messaging payment processing system. Display 602 shows an exemplary screen shot of a graphical interface showing a form that may be generated by a program operating on a mobile device of a payor. The program may permit for entry of information into display boxes in a graphical interface, and may then assemble the entered information into an SMS text message. For example, as shown, the payor is prompted to enter an identifier for a recipient of a payment, along with an amount of the payment. Generally, information may be entered into the form using standard key entry on a telephone keypad.

Various entry assistance tools may also be provided. For example, telephone keypad short-cuts (e.g., # or *) may be shown on certain controls such as selection buttons to indicate that those keys can be used to immediately select such controls. A user may also otherwise navigate from control to control, using e.g., a scroll wheel or a directional keypad. Drop-down controls may also be shown for each data entry box. Selection of such arrows may cause the device to display a list of objects, such as recipient identifiers and/or amounts. For example, a user may navigate to the first drop down control and press a selection key. That action may cause the drop down menu to be displayed, which may involve showing a list of the most recently-entered recipient identifiers, from which the user may readily select. The program may then take the two entered variables and assemble them together with other information to produce a text message request for a funds transfer.

Display 604 provides an example of a display that may be presented to a payee. The display 604 is shown as a branded text message display, which shows an identifying logo and an associated text message, perhaps in a more pleasing format than a standard text message. Alternatively, the text message can be displayed in its general format, as controlled by the device receiving the message. As shown in display 604, the text message tells the recipient that the message is a payment notice. It also indicates that payment has been received, the amount of the payment, and the payor (which may be eliminated to make the transaction more anonymous). In addition, it includes text instructing the user how to perform follow-up actions, such as pressing a * key or a # key. Alternatively, the message may include a URL or may instruct the user with other information.

FIG. 7A shows a screen shot for reporting, and management, of an account with a payment system. This exemplary display can be shown on the monitor of a desktop computer by a user who logs into a payment system using his or her account information. Other similar reports may also be provided to the user. As shown, the report lists transactions for a user's account so that the user can review and analyze such activity. Selection boxes near the top of the display permit the user to set a date range for the report—here the month of December 2005. In addition, a button labeled "XML" can be selected by the user to have data from the report packaged into an XML transmission so that the user may analyze the data using a local application. Other reports and forms of data may also be transmitted in similar manners for local manipulation and review by a user. Such data export may allow information to be imported conveniently into a user's personal finance package, such as Intuit Quicken or Microsoft Money. For additional guidance, the user's name and account ID are also shown.

The transactions histories are shown in this exemplary report broken into receipts and payments. Each transaction type is further grouped by the other party to the transaction. Each party can be collapsed or expanded to show more or less detail, as desired, in a conventional manner. The number of underlying transactions is shown as a parenthetical next to each party name. A quick review of the report shows that Mr. Lowens has a real liking for caffeinated drinks, and less of a liking for farm-grown produce. The form of the report may thus highlight the financial toll that the former liking is taking on the user.

Various transaction details may also be shown. For example, the price of each transaction may be shown. This price may include only the price of the underlying transaction, or, where fees are charged by the service, may also include any relevant fee. Fees may also be displayed separately. In addition, the status of each transaction may be shown. In the figure, most of the transactions are closed, as most person-to-person transactions would expect to be. However, the transaction with VeggieGirl is open, perhaps indicating that funds have been escrowed, or held, pending VeggieGirl's signing up with the system, as discussed above.

Verification details may also be displayed and accessed. For example, one entry shows that Mr. Lowens, in a Christmas Eve panic, purchased an iPod for his significant other at Target. That transaction exceeded his standard limit for a transaction, so that verification was required. The verification could be a signature (e.g., using an already-installed Target signature pad or a touch screen on the user's mobile device which may be checked by the teller) or could be an audio clip obtained by calling the user's device and requesting that the user speak a particular phrase. By clicking on the "V" icon, the user may hear a recording of his spoken phrase or see an image of his signature, as appropriate.

The information in the report may also be rearranged or resorted in various manners. For example, each column of a report may have a label at the top, and clicking on the label may force a sort or reverse sort based on the column under the label, similar to sorting in applications like Microsoft Outlook. Users may also be allowed to select additional fields to show in the display, and to rearranged the order of the columns in the report, for example, using drag-and-drop functionality. In addition, all or part of the report may be printed to hard copy when requested by a user. Also, although the report is shown in a browser window, it may also be generated by a dedicated program accessing data from the internet, such as by HTTP request or otherwise.

Figure 8:
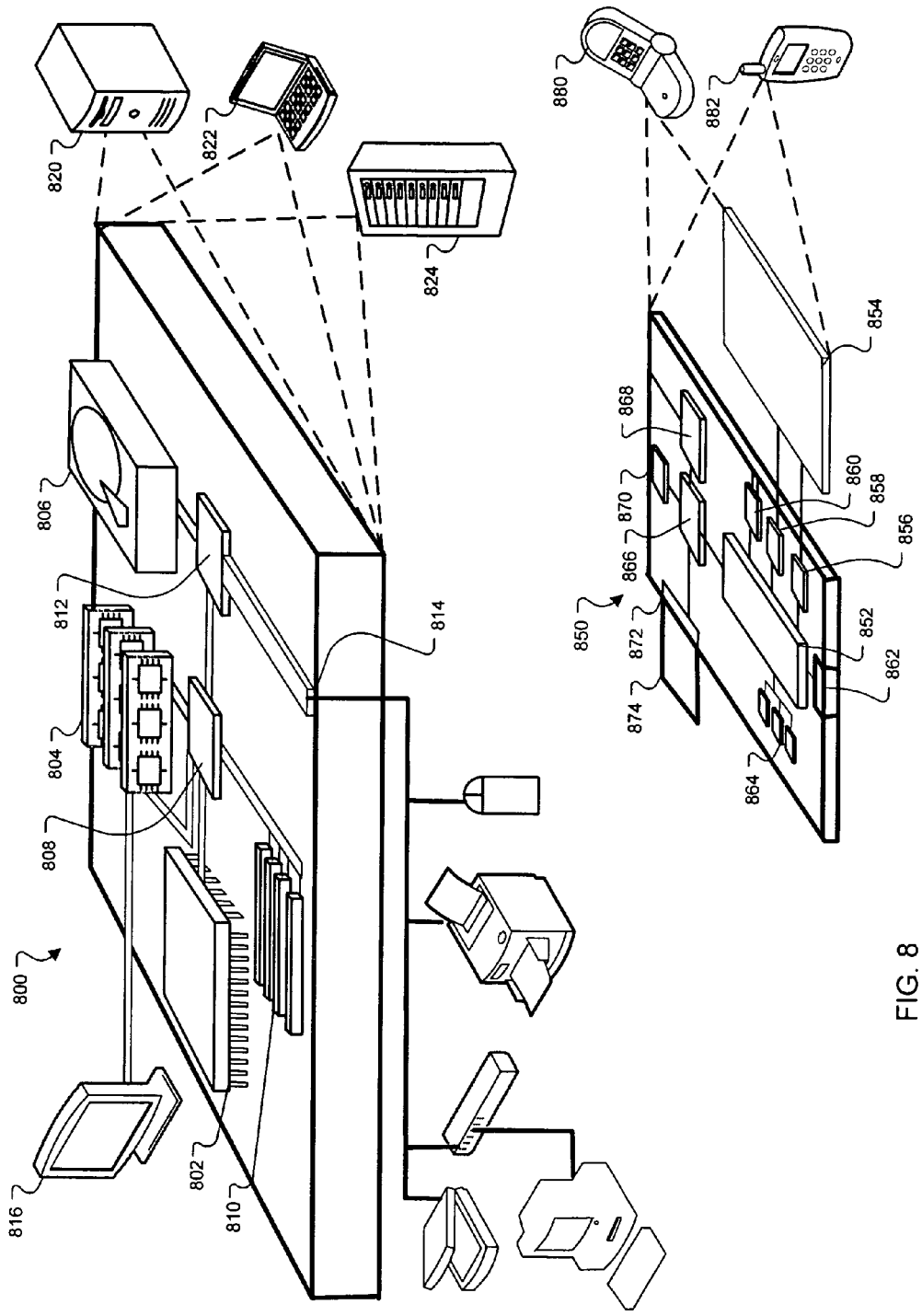
FIG. 8 is a block diagram of computing devices that may be used to implement the systems and methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network. The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method of effectuating a payment, comprising:
   receiving, by a computer server system, a text message from a payor comprising a payment request that corresponds to a payment intended for one of a plurality of stores that are each associated with an entity, wherein the payment request comprises a payment amount sent by a payor device operating independently of the computer server system and the plurality of stores, and wherein the payment request does not comprise information identifying a target store;
   determining, by the computer server system, a target store from among the plurality of stores to which the payment request is directed, wherein the target store is determined based, at least in part, on a location of the payor device when the payment request is submitted; and
   causing, by the computer server system, a change in a payor account associated with the payor and a payee account associated with the entity or the target store in response to the payment request.

2. The method of claim 1, wherein the text message is in the form of an SMS message.

3. The method of claim 1, further comprising routing a payment confirmation to the target store.

4. The method of claim 1, further comprising authenticating identifying information for the payee before authenticating identifying information for the payor.

5. The method of claim 1, further comprising obtaining payment from a financial institution with which the payor has an account.

6. The method of claim 1, wherein a supervisory user associated with the payor is notified by text messaging.

7. A system for managing financial payments, comprising:
   a text message interface configured to receive payment requests from remote text messaging devices, wherein each payment request corresponds to a payment intended for one of a plurality of stores that are each associated with an entity, and wherein the payment request does not comprise information identifying a target store;
   an accounts database to store information on a plurality of users registered with the system; and
   a transaction module in electronic communication with the interface and the accounts database to determine, from among the plurality of stores, a target store to which the payment request is directed, and to transfer funds from a registered user to the entity or the target store in response to a text messaged payment request associated with the first registered user, wherein the transaction module determines the target store based, at least in part, on a location of the remote text messaging device that sent the payment request.

8. The system of claim 7, wherein the text message interface comprises one or more servers having message parsers to extract payment commands from received text messages.

9. The system of claim 7, further comprising a transaction rules database containing rules that set amount-related limits on transactions.

10. The system of claim 7, wherein the text message interface is configured to receive SMS messages.

11. The system of claim 7, wherein the text message interface is configured to parse store determinant information from the received payment requests.

12. The system of claim 7, wherein the transaction module transfers funds only upon receiving an approval from a supervisory user that is different from the registered user.

13. The system of claim 7, wherein the transaction module routes a payment confirmation message to the target store after funds have been transferred.

14. A computer program product, comprising:
a non-transitory computer-readable medium having computer-readable program instructions embodied therein that when executed by a computer cause the computer to effectuate a payment, the computer-readable program instructions comprising:
computer-readable program instructions for receiving a text message from a payor comprising a payment request that corresponds to a payment intended for one of a plurality of stores that are each associated with an entity, wherein the payment request comprises a payment amount sent by a payor device, and wherein the payment request does not comprise information identifying a target store;
computer-readable program instructions for determining a target store from among the plurality of stores to which the payment request is directed, wherein the target store is determined based, at least in part, on a location of the payor device when the payment request is submitted; and
computer-readable program instructions for causing a change in a payor account associated with the payor and a payee account associated with the entity or the target store in response to the payment request.

15. The computer program product of claim 14, wherein the text message is in the form of an SMS message.

16. The computer program product of claim 14, further comprising computer-readable program instructions for routing a payment confirmation to the target store.

17. The computer program product of claim 14, further comprising computer-readable program instructions for authenticating identifying information for the payee before authenticating identifying information for the payor.

18. The computer program product of claim 14, further comprising computer-readable program instructions for obtaining payment from a financial institution with which the payor has an account.

19. The computer program product of claim 14, wherein a supervisory user associated with the payor is notified by text messaging.

\* \* \* \* \*